United States Patent
Yang et al.

(10) Patent No.: US 6,867,467 B2
(45) Date of Patent: Mar. 15, 2005

(54) CAPACITIVE MICRO-ELECTRO-MECHANICAL SWITCH AND METHOD OF MANUFACTURING THE SAME

(75) Inventors: Woo Seok Yang, Daejon-Shi (KR); Sung Weon Kang, Daejon-Shi (KR); Yun Tae Kim, Daejon-Shi (KR); Sung Hae Jung, Daejon-Shi (KR)

(73) Assignee: Electronics and Telecommunication Research Institute, Daejon-Shi (KR)

( * ) Notice: Subject to any disclaimer, the term of this patent is extended or adjusted under 35 U.S.C. 154(b) by 119 days.

(21) Appl. No.: 10/329,390

(22) Filed: Dec. 27, 2002

(65) Prior Publication Data

US 2003/0151879 A1 Aug. 14, 2003

(30) Foreign Application Priority Data

Oct. 2, 2002 (KR) ................................ 10-2002-0060107

(51) Int. Cl.[7] ............................................. H01L 29/82
(52) U.S. Cl. ...................... 257/415; 257/417; 257/532
(58) Field of Search ................................ 257/414, 415, 257/417, 532

(56) References Cited

U.S. PATENT DOCUMENTS

| | | | | |
|---|---|---|---|---|
| 5,619,061 A | | 4/1997 | Goldsmith et al. | |
| 5,880,921 A | * | 3/1999 | Tham et al. | 361/233 |
| 6,529,093 B2 | * | 3/2003 | Ma | 333/101 |
| 6,621,390 B2 | * | 9/2003 | Song et al. | 335/78 |
| 6,657,525 B1 | * | 12/2003 | Dickens et al. | 335/78 |
| 6,700,172 B2 | * | 3/2004 | Ehmke et al. | 257/415 |
| 2002/0027064 A1 | | 3/2002 | York et al. | |
| 2004/0119126 A1 | * | 6/2004 | Chen et al. | 257/415 |

FOREIGN PATENT DOCUMENTS

| | | | | |
|---|---|---|---|---|
| KR | 2001-38214 | 5/2001 | | H01L/29/86 |
| KR | 2001-47068 | 6/2001 | | H01L/29/86 |

* cited by examiner

*Primary Examiner*—T. N. Quach
(74) *Attorney, Agent, or Firm*—Mayer, Brown, Rowe & Maw LLP

(57) ABSTRACT

The present invention relates to a capacitive micro-electro-mechanical switch and method of manufacturing the same. In the capacitive micro-electro-mechanical switch for use in the radio frequency (RF) and the microwave driven by the electrostatic force, a capacitor of a 3-dimensional structure is formed on a signal transmission line. An ON capacitance is increased without increasing an capacitor area while preventing an increase in an OFF capacitance using the capacitor. Thus, an ON/OFF capacitance ratio of the capacitive micro-electro-mechanical switch can be increased and insertion loss and isolation characteristic could be improved.

15 Claims, 20 Drawing Sheets

US 6,867,467 B2

CAPACITIVE MICRO-ELECTRO-MECHANICAL SWITCH AND METHOD OF MANUFACTURING THE SAME

BACKGROUND OF THE INVENTION

1. Field of the Invention

The invention relates generally to a capacitive micro-electro-mechanical switch and method of manufacturing the same. More particularly, the invention relates to a capacitive micro-electro-mechanical switch for use in the radio frequency (RF) and the microwave that are driven by an electrostatic force and method of manufacturing the same, capable of simultaneously improving insertion loss and isolation characteristics.

2. Description of the Prior Art

Generally, an electron system used in the radio frequency and the microwave band includes a semiconductor switch such as a field effect transistor (FET) or a p-i-n diode in order to control the signal. However, this type of the semiconductor switch has problems like high insertion loss, low isolation, signal distortion, and the like. In order to solve these problems of the semiconductor switch, a research on a micro-electro-mechanical switch has recently been widely made.

The micro-electro-mechanical switch is driven by the electrostatic force. The micro-electro-mechanical switch is classified into a resistive type and a capacitive type depending on its driving mode.

The resistive switch is formed on two signal transmission lines spaced apart with a given air gap. The resistive switch includes a deflecting plate used as the top electrode and a ground line used as the bottom electrode. In the above, the deflecting plate is bent downwardly by the electrostatic force and is also electrically connected to the signal transmission lines. Through this structure, an ON/OFF operation of the resistive switch is completed. In other words, if the switch is in the OFF state since the electrostatic force is not applied, the signal is isolated. On the other hand, if the switch is in the ON state since the electrostatic force is applied, the signal is transferred.

On the other hand, the capacitive switch includes a deflecting plate of the top electrode connected to the ground line, a signal transmission line of the bottom electrode, and a dielectric film formed on the signal transmission line at a region where the deflecting plate and, the signal transmission line are intersected. In the above, if the deflecting plate is bent toward the signal transmission line by means of the electrostatic force and then contacts the dielectric film formed on the signal transmission line, the signal is bypassed from the signal transmission line to the ground line through the deflecting plate, by means of capacitance of the capacitor having a structure of the deflecting plate/dielectric film/signal transmission line. In other word, if the switch is in the OFF state since the electrostatic force is not generated, the signal is transferred. On the other hand, if the switch is in the ON state since the electrostatic force is generated, the signal is isolated.

As above, the resistive switch and the capacitive switch have not only different structure and operation but also a different frequency region. In detail, the resistive switch is mainly used at a low frequency region (for example, 0 Hz~20 GHz) and the capacitive switch is mainly used at a high frequency range (for example, 20 GHz~60 GHz).

The structure and operation of the conventional capacitive micro-electro-mechanical switch will be described by reference to the drawings.

FIG. 1 is a perspective view of one conventional capacitive micro-electro-mechanical switch for explaining a structure of the switch.

Referring now to FIG. 1, the capacitive micro-electro-mechanical switch includes a signal transmission line 110, a deflecting plate 120, a dielectric film 130, ground lines 140 and a metal post 150.

In the above, the signal transmission line 110 serves as the bottom electrode and the deflecting plate 120 serves as the top electrode. The dielectric film 130 is formed on the signal transmission line 110 at a region where the signal transmission line 110 and the deflecting plate 120 are intersected. The ground lines 140 are formed on the substrate with the signal transmission line 110 intervened between them. The metal posts 150 are formed on the ground lines 140 at a region where the deflecting plate 120 and the ground lines 140 are intersected. The deflecting plate 120 is fixed to the metal posts 150 and is suspended at a given space above the dielectric film 130. Meanwhile, the deflecting plate 120 is fixed to the metal posts 150 in a direction vertical to the signal transmission line 110.

FIG. 2A and FIG. 2B are conceptual drawings for explaining the operation of the capacitive micro-electro-mechanical switch shown in FIG. 1.

Referring FIG. 2A, if the switch is in the OFF state, a voltage is not applied between the signal transmission line 110 and the ground lines 140. Thus, the deflecting plate 120 is fixed to the ground lines 140 by the metal posts 150 and is floated over the dielectric film 130. Therefore, the signal is normally transferred through the signal transmission line 110.

By reference to FIG. 2B, on the contrary, if the switch is the ON state, a voltage from a voltage supply means 160 is applied between the signal transmission line 110 and the metal post 150. The deflecting plate 120 is thus bent toward the dielectric film 130 by means of the electrostatic force and then contacts the dielectric film 130. Therefore, a capacitor C100 having a structure in which the signal transmission line 110, the dielectric film 130 and the deflecting plate 120 are sequentially stacked is formed. The signal is bypassed from the signal transmission line 110 to the ground lines 140 through the deflecting plate 120 by means of capacitance of the capacitor C100.

At this time, as the surfaces of the signal transmission line 110 and the dielectric film 130 formed on it are not perfectly smooth, the deflecting plate 120 does not completely contact the dielectric film 130 but an air gap 170 is generated between the deflecting plate 120 and the dielectric film 130. As a result, the air gap 170 causes to degrade an electrical characteristic of the switch since it serves to reduce capacitance of the switch in the ON state.

FIG. 3A and FIG. 3B are conceptual drawings for explaining a structure and the operation of another conventional capacitive micro-electro-mechanical switch.

The capacitive micro-electro-mechanical switch shown in FIG. 3A and FIG. 3B is different from the structure of FIG. 1 in that it further includes an assistant electrode 121 formed on the dielectric film 130. As such, if the assistant electrode 121 is further included on the dielectric film 130, it can prevent reduction in capacitance in the ON state even though the deflecting plate 120 contacts only some regions of the assistant electrode 121 formed on the dielectric film 130. Therefore, even though an air gap 170 is generated between the deflecting plate 120 and the dielectric film 130, it can prevent degradation in the electrical characteristic of the switch due to the air gap 170.

Capacitance ($C_{off}$) when the capacitive micro-electromechanical switch in the OFF state, is equal to the sum in which capacitance ($C_{air}$) of the air gap and capacitance ($C_{dielectric}$) of the dielectric film 130 are serially connected, as in the mathematical equation 1 below. At this time, as $C_{air}$ is relatively very low compared to $C_{dielectric}$, $C_{off}$ has a value approximate to $C_{air}$.

$$C_{off} = C_{air} * C_{dielectric}/(C_{air} + C_{dielectric}) \sim C_{air} = \in_{air} A/h_{air} \quad \text{[Equation 1]}$$

On the contrary, capacitance ($C_{on}$) in the ON state is equal to $C_{dielectric}$ as in the mathematical equation 2 below.

$$C_{on} = C_{dielectric} = \in_{dielectric} A/h_{dielectric} \quad \text{[Equation 2]}$$

In Equations 1 and 2, $h_{dielectric}$ indicates the thickness of the dielectric film 130, $h_{air}$ indicates the thickness of the air gap between the dielectric film 130 and the deflecting plate 120, $\in_{dielectric}$ indicates the dielectric constant of the dielectric film 130, $\in_{air}$ indicates the dielectric constant of air, and A indicate an area of a region where the deflecting plate 120 and the signal transmission line 110 are overlapped.

The capacitive switch having a good electrical characteristic has a very low OFF capacitance and thus has a low insertion loss since most of signals are transferred along the signal transmission line. Also, the capacitive switch having a good electrical characteristic has a very high ON capacitance and thus has a good isolation characteristic since most of the signals are bypassed to the ground lines. As a result, the good capacitive switch must have a very high ON/OFF ratio ($C_{on}/C_{off}$) of capacitance.

At this time, a method of making low the OFF capacitance ($C_{off}$) includes a method of reducing an area (A) of a region where the deflecting plate and the signal transmission line are overlapped, and a method of increasing the thickness ($h_{air}$) of the air gap. If the former method is used, however, there is a problem that the ON capacitance ($C_{on}$) becomes also small. If the latter method is used, there is a problem that the driving voltage of the switch in proportion to $h_{air}^{3/2}$ must be high.

Meanwhile, a method of making high the ON capacitance ($C_{on}$) includes a method of increasing the area (A) of the region where the deflecting plate and the signal transmission line are overlapped, a method of reducing the thickness ($h_{dielectric}$) of the dielectric film, and a method of increasing the dielectric constant ($\in_{dielectric}$) of the dielectric film.

The first method can increase $C_{on}$. However, this method has problems that $C_{off}$ is increased and the size of the switch is also increased, as described above. Next, in the second method, if the thickness of the dielectric film is reduced below a given value, the dielectric breakdown is caused. Due to this, the second method has a limitation in reducing the thickness of the dielectric film. The third method is the most effective method to increase the ON capacitance. In this method, STO (strontium titanate oxide; $\in$=30~120) or BSTO (barium strontium titanate oxide; $\in$>200) having a high dielectric constant is used as the dielectric film instead of silicon nitride ($\in$=6~8) commonly used.

In the above conventional capacitive micro-electromechanical switch, a flat type capacitor of a two-dimensional structure is used. Thus, an area of the capacitor having the stack structure in which the deflecting plate, the air layer and the signal transmission line are stacked in the OFF state and an area of the capacitor having the structure in which the deflecting plate, the dielectric film and the signal transmission line are stacked in the ON state are equal. Due to this, if the area of the capacitor is increased, the isolation characteristic is improved since the ON capacitance ($C_{on}$) is increased. However, there is a problem that the insertion loss is also increased since the OFF capacitance ($C_{off}$) is increased. Therefore, the conventional capacitive micro-electro-mechanical switch has a structural problem in increasing the ON/OFF ratio ($C_{on}/C_{off}$) of capacitance.

SUMMARY OF THE INVENTION

The present invention is contrived to solve the above problems and an object of the present invention is to provide a capacitive micro-electro-mechanical switch and method of manufacturing the same capable of increasing the ON/OFF capacitance ratio of the capacitive micro-electro-mechanical switch and simultaneously improving insertion loss and signal isolation characteristics, in a way that a capacitor of a three-dimensional structure is formed on a signal transmission line and an ON capacitance is increased without an increase of an area while preventing an increase in an OFF capacitance.

In order to accomplish the above object, a capacitive micro-electro-mechanical switch according to a preferred embodiment of the present invention, is characterized in that it comprises a first line form on a substrate, an insulating layer having a hole through which a given region of the first line is exposed, a capacitor of a 3-dimensional structure formed in the hole on the first line, a metal post formed on the insulating layer, in a direction vertical to the first lines from the capacitor, and a second line spaced apart from the top of the capacitor by a given gap, wherein a portion of the second line is overlapped with the capacitor and an edge of the second line is fixed to the metal post in a direction vertical to the first line.

In the above, the capacitor has a stack structure of an assistant bottom electrode, a dielectric film and an assistant top electrode. At this time, a plurality of holes are formed in the insulating layer, and the capacitor is formed in every hole in a concave shape to have a 3-dimensional structure. Also, the capacitor includes unit capacitors formed in every hole and in parallel connected one another.

The capacitor has a 3-dimensional structure of a multi-layered shape including an assistant bottom electrode having multi-layered electrode layers connected one another at one edge of the first line and electrically connected to the first line, an assistant top electrode having multi-layered electrode layers connected one another at the other edge of the first line, wherein the uppermost layer of the assistant top electrode is exposed, and a dielectric film formed between the assistant bottom electrode and the assistant top electrode.

The assistant bottom electrode and the assistant top electrode are made of any one of Au, Al, W, Cu, TiN and Pt and the dielectric film is made of any one of $Si_3N_4$, $Ta_2O_5$, $SrTiO_3$ and $Ba_{0.5}Sr_{0.5}TiO_3$.

Ah adhesive layer is further formed between the substrate and the first line.

The insulating layer is made of any one of silicate glass, PSG and BPSG.

A contact pad is further formed on the capacitor. At this time, the contact pad is made of a noble metal or a conductive oxide layer.

Ground lines are further formed on the substrate with the first line intervened, and the metal post is electrically connected to the ground lines. At this time, the second line is fixed to one metal post in a cantilever shape, or two metal posts at both sides of the capacitor in a membrane shape. The metal post is made of any one of Au, Al, W, Cu, TiN, Pt and Ni.

The second line is made of any one of Au, Al, W, Cu, TiN, Pt and Ni.

A method of manufacturing a capacitive micro-electromechanical switch according to one embodiment of the present invention, is characterized in that it comprises the steps of forming a first line on a substrate, forming an insulating layer on the substrate and then forming a plurality of holes through which a given portion of the first line is exposed, sequentially forming an assistant bottom electrode, a dielectric film and an assistant top electrode at a region where a capacitor will be formed including the hole, thus forming the capacitor, forming a sacrificial layer on the entire structure including the capacitor, forming a hole in the sacrificial layer in a direction vertical to the first line from the capacitor, burying the hole formed in the sacrificial layer with a conductive material to form a metal post, forming seconds lines in a given region which is overlapped with the capacitor and an end portion of which is connected to the metal post, and removing the sacrificial layer.

In the above, in the step of forming the first line, ground lines in parallel to the first line are formed on the substrate.

The insulating layer is formed by depositing any one of silicate glass, PSG and BPSG by means of a chemical deposition method, and the hole formed in the insulating layer is formed by a deep reactive ion etch method for a high aspect ratio.

The assistant bottom electrode and the assistant top electrode are formed by depositing any one of conductive materials such as Au, Al, W, Cu, TiN and Pt by means of a chemical vapor deposition method and then leaving the conductive material only at a region where the capacitor is formed by means of a reactive ion etch method.

The dielectric film is made of any one of $Si_3N_4$, $Ta_2O_5$, $SrTiO_3$ and $Ba_{0.5}Sr_{0.5}TiO_3$.

The method further comprises the step of forming a contact pad made of a noble metal or a conductive oxide layer on the assistant top electrode of the capacitor, before the sacrificial layer is formed after the capacitor is formed. At this time, the contact pad is formed only at the central portion of the assistant top electrode.

The sacrificial layer is made of polyimide and is removed by $O_2$ microwave plasma ashing process. The hole is formed on the sacrificial layer at both sides of the capacitor with the capacitor intervened, so that both ends of the second line are each connected to the metal post, or at one side of the capacitor in a direction vertical to the first line, so that one of the ends of the second line is connected to the metal post.

A method of manufacturing a capacitive micro-electromechanical switch according to another embodiment of the present invention, is characterized in that it comprises the steps of forming a first line on a substrate, forming a capacitor of a multi-layered shape at a given region of the first line, in which assistant bottom electrode layer and the first line are electrically connected at one edge of the first line while the assistant bottom electrode layers and assistant top electrode layers are alternately stacked and the assistant top electrode layers are connected one another at the other edge of the first line, wherein the capacitor has a dielectric film between the assistant bottom electrode layers and the assistant top electrode layers, forming an insulating layer up to the height of the capacitor so that the surface of the uppermost layer of the assistant top electrode layers is exposed, forming a sacrificial layer on the entire structure including the capacitor, forming a hole in the sacrificial layer in a direction vertical to the first line from the capacitor, burying a conductive material in the hole formed in the sacrificial layer to form a metal post, forming a second line in a given region which is overlapped with the capacitor and an end portion of which is connected to the metal post, and removing the sacrificial layer.

In the above, in the step of forming the first line, ground lines in parallel to the first line are simultaneously formed on the substrate.

The assistant bottom electrode and the assistant top electrode are made of any one of Au, Al, W, Cu, TiN and Pt, and the dielectric film is formed by depositing any one of $Si_3N_4$, $Ta_2O_5$, $SrTiO_3$ and $Ba_{0.5}Sr_{0.5}TiO_3$ by means of a radio frequency sputtering method.

The insulating layer is made of any one of silicate glass, PSG and BPSG.

The method further comprises the step of forming a contact pad made of a noble metal or a conductive oxide layer on the capacitor, before the sacrificial layer is formed after the insulating layer is formed The sacrificial layer is made of polyimide and is removed by $O_2$ microwave plasma ashing process. The hole is formed in the sacrificial layer at both sides of the capacitor with the capacitor intervened, so that both ends of the second line are each connected to the metal post, or at one side of the capacitor in a direction vertical to the first line, so that one of the ends of the second line is connected to the metal post.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
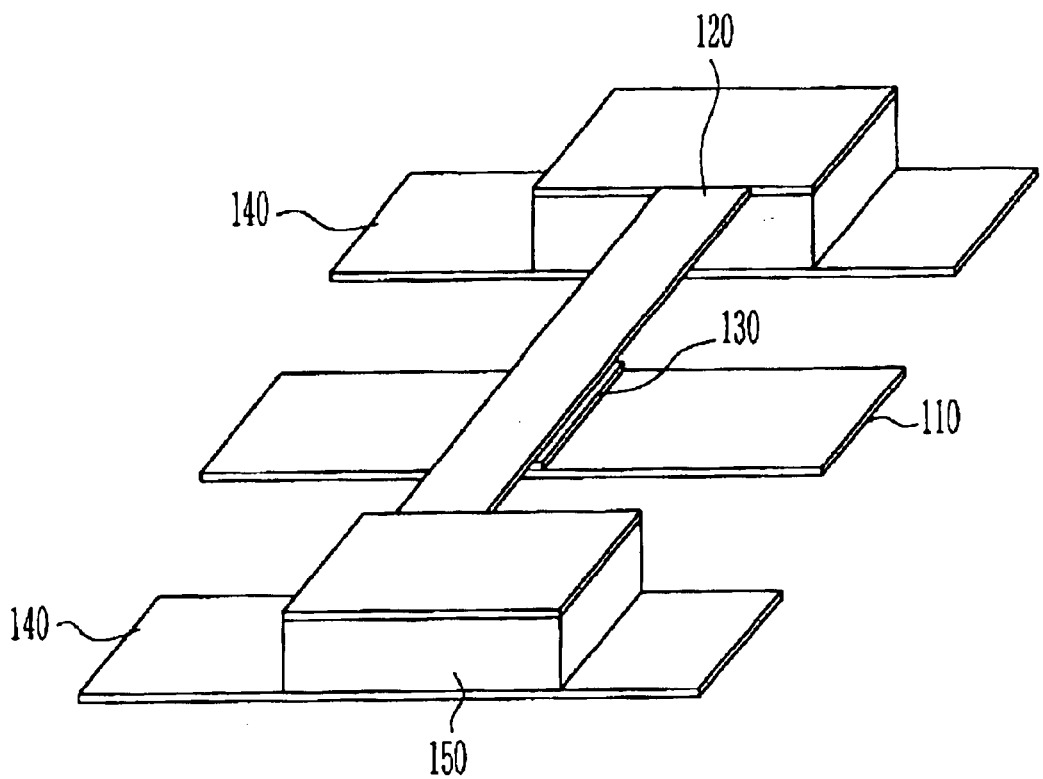
FIG. 1 is a perspective view of one conventional capacitive micro-electro-mechanical switch for explaining a structure of the switch.
Figure 2A:
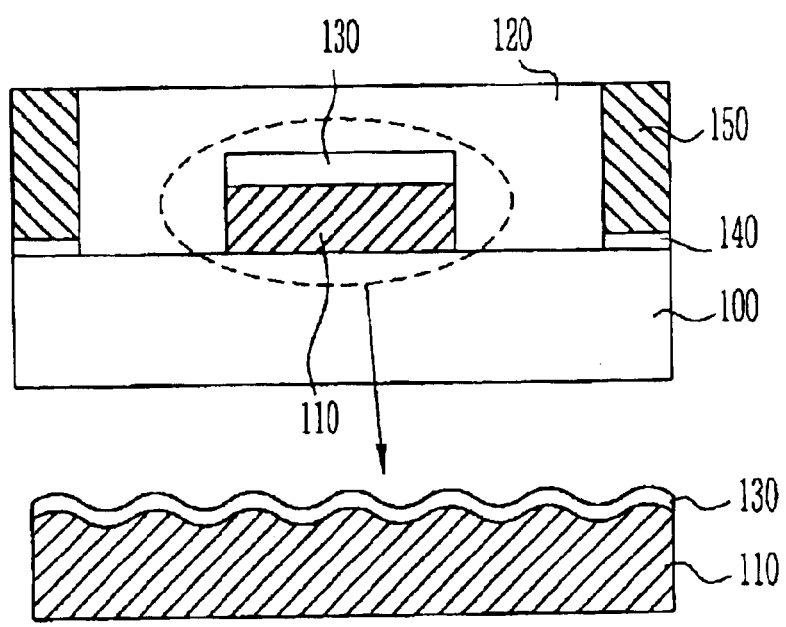
FIG. 2a and FIG. 2B are conceptual drawings for explaining the operation of the capacitive micro-electro-mechanical switch shown in FIG. 1.
Figure 2B:
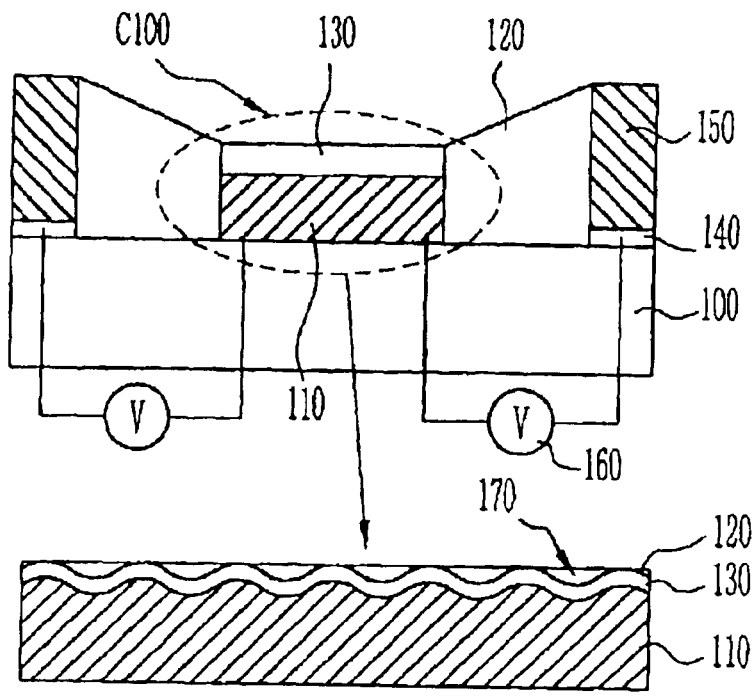

The present invention will be described in detail by way of a preferred embodiment with reference to accompanying drawings, in which like reference numerals are used to identify the same or similar parts.

Figure 4A:
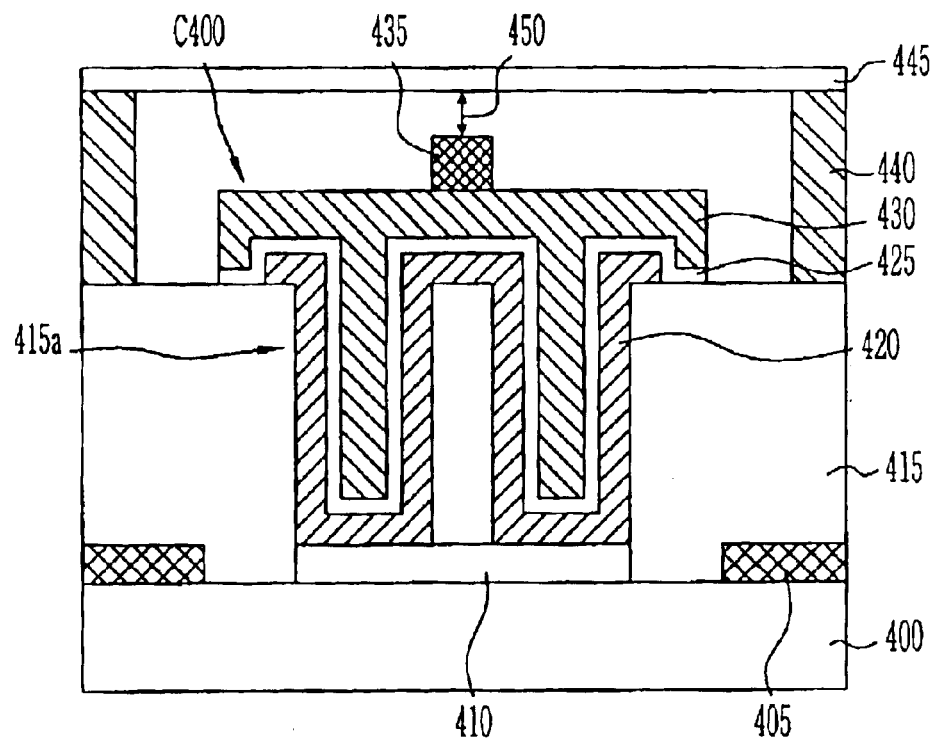
FIG. 4A and FIG. 4B are conceptual drawings for explaining a structure and the operation of a capacitive micro-electro-mechanical switch according to one preferred embodiment of the present invention.
Figure 4B:
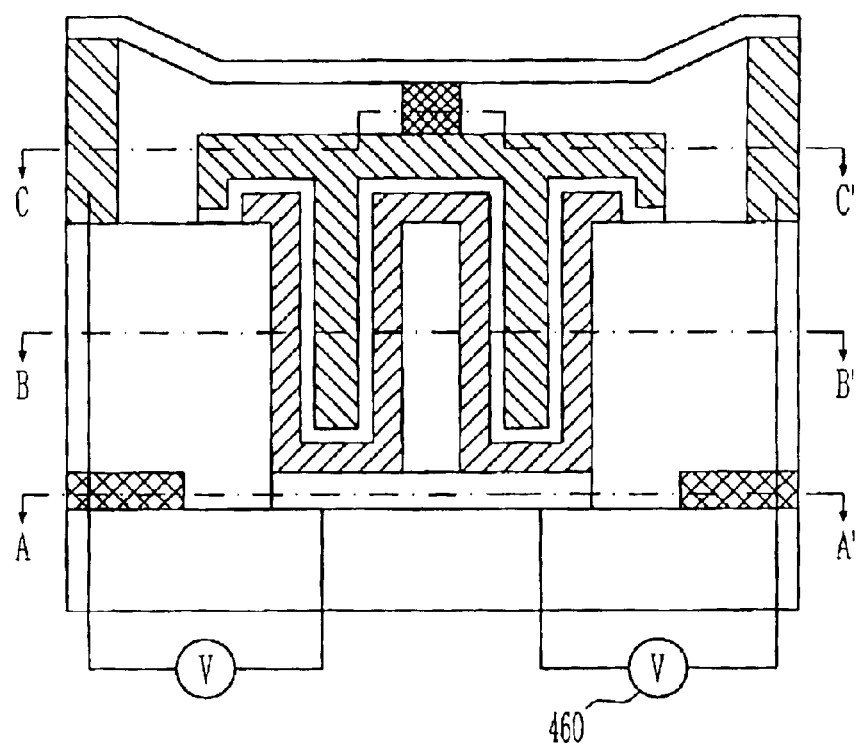

FIG. 4A and FIG. 4B are conceptual drawings for explaining a structure and the operation of a capacitive micro-electro-mechanical switch according to one preferred embodiment of the present invention.

Referring now to FIG. 4A, the capacitive micro-electro-mechanical switch of the present invention includes ground lines 405, a signal transmission line 410, an insulating layer 415, an assistant bottom electrode 420, a dielectric film 425, an assistant top electrode 430, metal posts 440 and a deflecting plate 445.

In the above, the ground lines 405 are formed on a substrate 400 with the signal transmission line 410 intervened between them. At this time, the substrate 400 may be made of semi-insulating GaAs, etc. The ground lines 405 and the signal transmission line 410 may be made of a noble metal such as Au, etc. Meanwhile, an adhesive layer (not shown) may be formed between the substrate 400 and the ground lines 405, and between the substrate 400 and the signal transmission line 410 in order to improve an adhesive characteristic.

The insulating layer 415 is formed on the substrate 400 including the ground lines 405 and the signal transmission line 410. A plurality of contact holes 415a through which the signal transmission line 410 is exposed, are formed in the insulating layer 415. At this time, the insulating layer 415 is made of any one of silicate glass, PSG (phosphorus doped-silicate glass) and BPSG (boron phosphorus doped-silicate glass).

The assistant bottom electrode 420, the dielectric film 425 and the assistant top electrode 430 are stacked on the insulating layer 415 over the signal transmission line 410 including the lateral surface and bottom surface of the contact holes 415a. Thereby, a capacitor C400 of a concaved shape is formed. At this time, the assistant bottom electrode 420 and the assistant top electrode 430 are made of any one of Au, Al, W, Cu, TiN and Pt. Also, the dielectric film 425 is made of any one of $Si_3N_4$, $Ta_2O_5$, STO($SrTiO_3$) and BSTO($Ba_{0.5}Sr_{0.5}TiO_3$). Meanwhile, the widths of the dielectric film 425 and the assistant top electrode 430 may be wider than the assistant bottom electrode 420.

The metal posts 440 are formed on the insulating layer 415 with the assistant top electrode 430 intervened between them. The deflecting plate 445 has a thin membrane shape. Also, both edges of the deflecting plate 445 are fixed to the metal posts 440 in a direction vertical to the signal transmission line 410. At this time, the deflecting plate 445 does not normally contact the assistant top electrode 430 or the contact pad 435. The height of the metal posts 440 is formed to be higher than the assistant top electrode 430 or the contact pad 435 so that the air gap 450 can be located between the deflecting plate 445 and the contact pad 435. Though the two metal posts 440 are formed on the insulating layer 415 with the assistant top electrode 430 intervened between them in FIG. 4A, it should be noted that only one metal post 440 could be formed and the deflecting plate 445 is fixed to one metal post 440, so that the deflecting plate 445 has a cantilever shape.

In the above, it is possible to form the capacitive micro-electro-mechanical switch without forming the ground lines 405. If the capacitive micro-electro-mechanical switch is manufactured to have a co-planar waveguide shape in which the ground lines 405 is formed, the metal posts 440 are electrically connected to the ground lines 405 (its connection state is not shown). Meanwhile, if the capacitive micro-electro-mechanical switch is manufactured to have a microstrip shape in which the ground lines 405 is not formed, the metal posts 440 are electrically directly connected to the ground terminal (not shown).

Also, a contact pad 435 may be further formed on the assistant top electrode 430. The contact pad 435 may be formed of a noble metal such as Au, Pt, or the like, or conductive oxide such as $IrO_2$, $RuO_2$, or the like. At this time, the contact pad 435 may be formed at the central portion of the assistant top electrode 430 so that it has an area smaller than the assistant top electrode 430. If the switch is turned on, the deflecting plate 445 first contacts the contact pad 435 than the assistant top electrode 430.

If the capacitive micro-electro-mechanical switch constructed above is in an OFF state, an electrical signal is normally transferred along the signal transmission line 410, as shown in the drawing.

Referring now to FIG. 4B, if a voltage from the voltage supply means 460 is applied between the metal posts 440 and the signal transmission line 410, the electrostatic force is generated by the capacitor having the structure in which the deflecting plate 445, the air layer 450, the contact pad 435 and the assistant top electrode 430 are stacked. If the electrostatic force is generated, the deflecting plate 445 is bent toward the assistant top electrode 430 by means of the electrostatic force, thus contacting the contact pad 435. If the deflecting plate 445 contacts the contact pad 435 or the assistant top electrode 430, the electrical signal transferred along the signal transmission line 410 is isolated by capacitance generated from the capacitor having the assistant bottom electrode 420, the dielectric film 425 and the assistant top electrode 430. Due to this, the electrical signal is bypassed to the ground terminal (not shown) through the assistant top electrode 430.

Figure 5A:
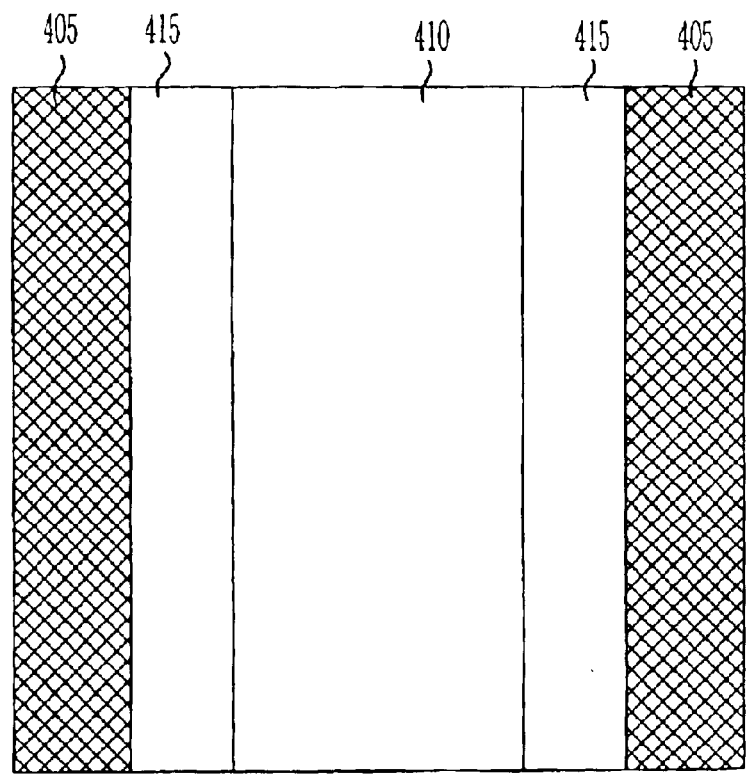
FIG. 5A~FIG. 5C are plan views of the capacitive micro-electro-mechanical switches shown in FIG. 4B taken along lines A–A', B–B' and C–C'.
Figure 5B:
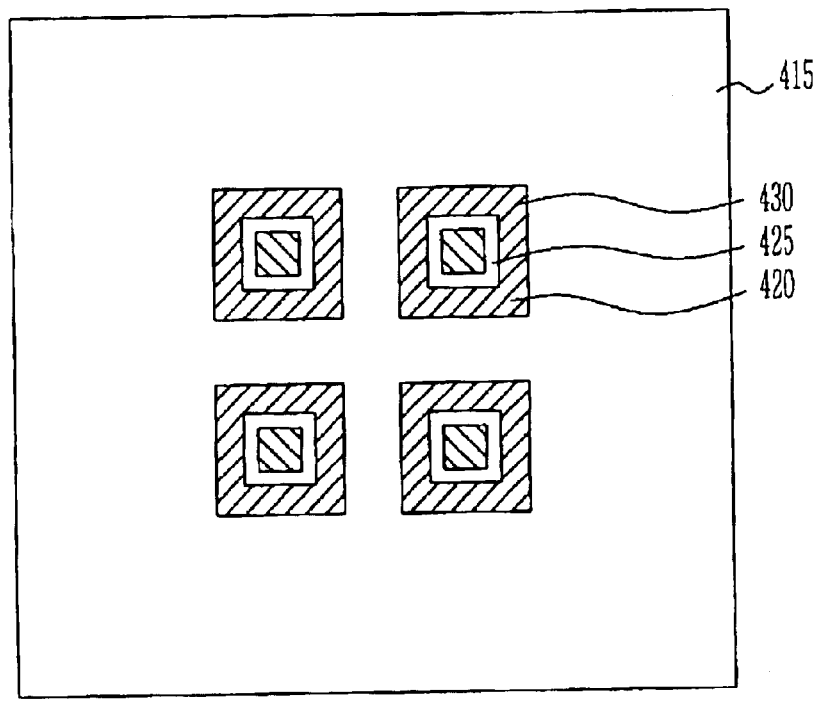
Figure 5C:
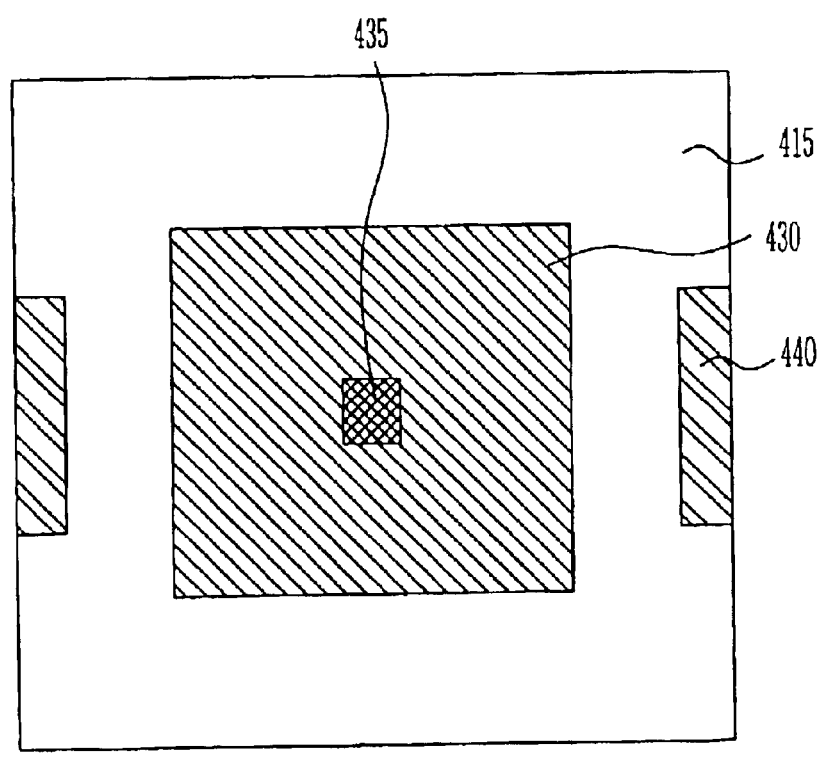

FIG. 5A~FIG. 5C are plan views of the capacitive micro-electro-mechanical switches shown in FIG. 4B taken along lines A–A', B–B' and C–C'.

Referring now to FIG. 5A, the signal transmission line 410 is formed between the ground lines 405. The insulating layers 415 are buried between the ground lines 405 and the signal transmission lines 410.

By reference to FIG. 5B, the assistant top electrode 430 is surrounded by the dielectric film 425 and the dielectric film 425 is surrounded by the assistant bottom electrode 420, so that the capacitor having the stack structure of the assistant top electrode 430, the dielectric film 245 and the assistant bottom electrode 420 is formed. Though these unit capacitors are separated by the insulating layers 415 and arranged in parallel, the assistant bottom electrode 420 of the capacitor is connected to a given region of the signal transmission line 410 shown in FIG. 5A, so that a single capacitor is formed. Meanwhile, though it was shown that four capacitors of a rectangular shape are formed in FIG. 5B, the shape and number of the capacitor may be variously changed depending on the design and manufacture process of the switch.

Referring now to FIG. 5C, several assistant top electrodes 430 shown in FIG. 5B are all connected by a single large assistant top electrode formed on the insulating layer 415. A contact pad 435 of a smaller size is formed on the assistant top electrode 430.

As above, the present invention can increase the ON/OFF capacitance ratio and improve insertion loss and isolation characteristics by increasing the ON capacitance of the switch without an increase in the OFF capacitance or in switch area, using the capacitive micro-electro-mechanical switch having the three-dimensional structure, which is formed on the insulating layer 415 having a plurality of contact holes 415a through which a given region of the signal transmission line 410 is exposed and is connected to the signal transmission line 410.

A method of manufacturing the capacitive micro-electro-mechanical switch constructed above will be now described.

FIG. 6A~FIG. 6H are cross-sectional views of the capacitive micro-electro-mechanical switches for explaining a method of manufacturing the switch. FIG. 7A~FIG. 7H are layout diagrams of each of the switches in FIG. 6A~FIG. 6H.

Figure 6A:
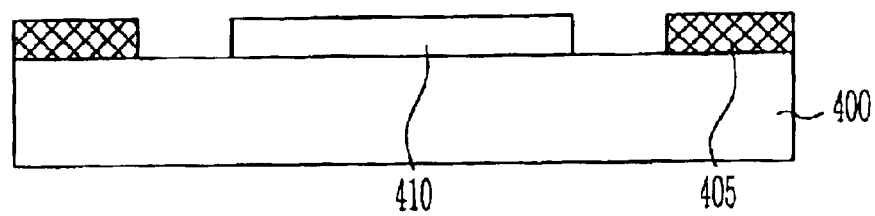
FIG. 6A~FIG. 6H are cross-sectional views of the capacitive micro-electro-mechanical switches for explaining a method of manufacturing the switch.
Figure 7A:
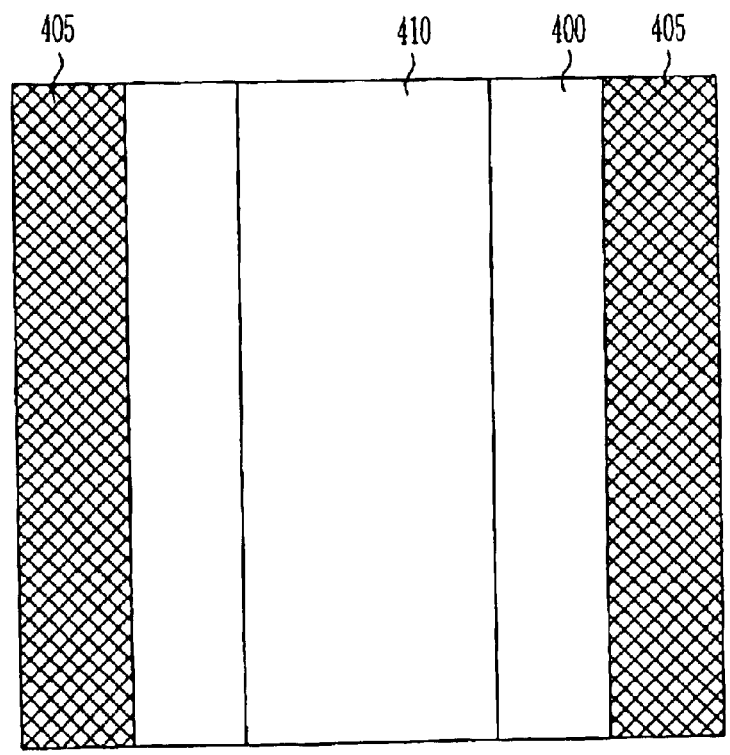
FIG. 7A~FIG. 7H are layout diagrams of each of the switches in FIG. 6A~FIG. 6H.

Referring now to FIG. 6A and FIG. 7A, the ground lines 405 and the signal transmission line 410 are formed on the substrate 400. At this time, the ground lines 405 and the signal transmission line 410 are formed so that the signal transmission line 410 is located between the ground lines 405.

In the above, the substrate 400 may be made of semi-insulating GaAs, or the like. Also, the ground lines 405 and the signal transmission line 410 may be made of a noble metal such as Au, etc. and are simultaneously formed by means of evaporation deposition and lift-off processes. Meanwhile, in order to improve an adhesive characteristic of the ground lines 405 and the signal transmission line 410 made of the noble metal, the ground lines 405 and the signal transmission line 410 may be formed after an adhesive layer (not shown) is formed on the substrate 400. At this time, the adhesive layer may be formed using Ti, or the like.

Figure 6B:
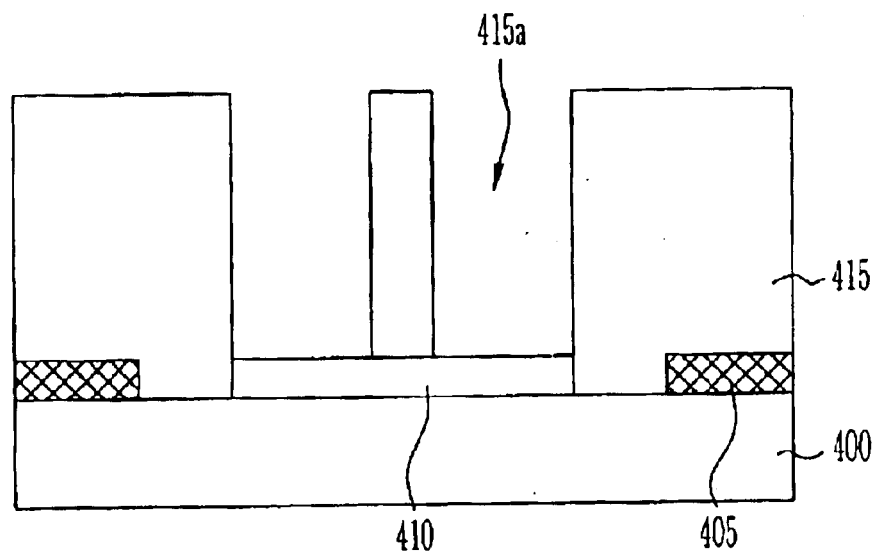
Figure 7B:
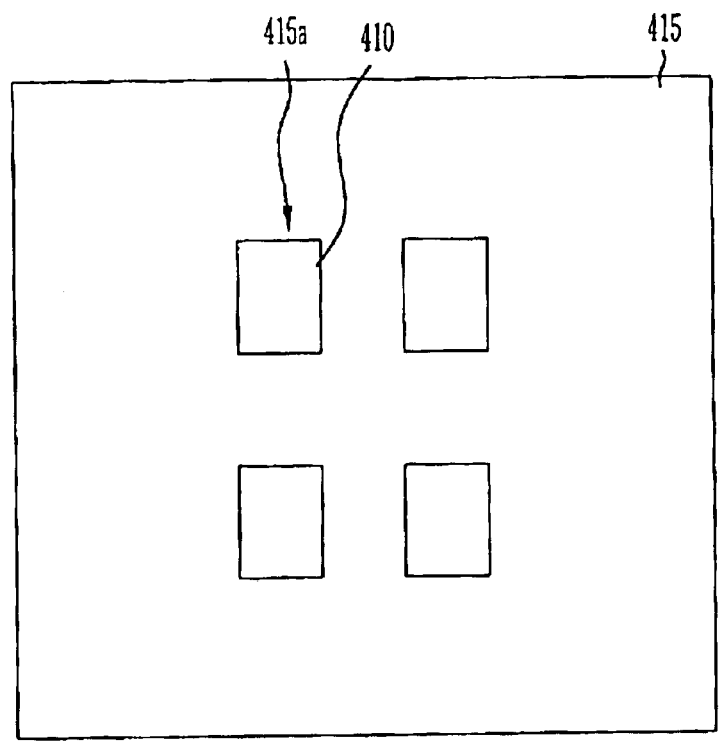

Referring now to FIG. 6B and FIG. 7B, after the insulating layer 415 is formed on the entire structure, the plurality of the contact holes 415a through which a given region of the signal transmission line 410 is exposed are formed.

At this time, the insulating layer 415 is formed using any one of silicate glass, PSG (phosphorus doped-silicate glass) and BPSG (boron phosphorus doped-silicate glass) by means of chemical deposition method. Meanwhile, the contact holes 415a is formed by deep RIE (reactive ion etch) method.

Figure 6C:
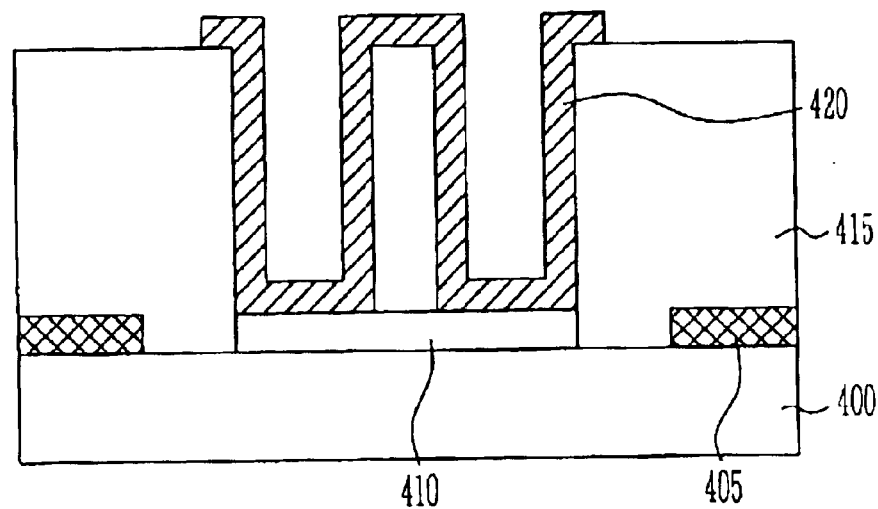
Figure 7C:
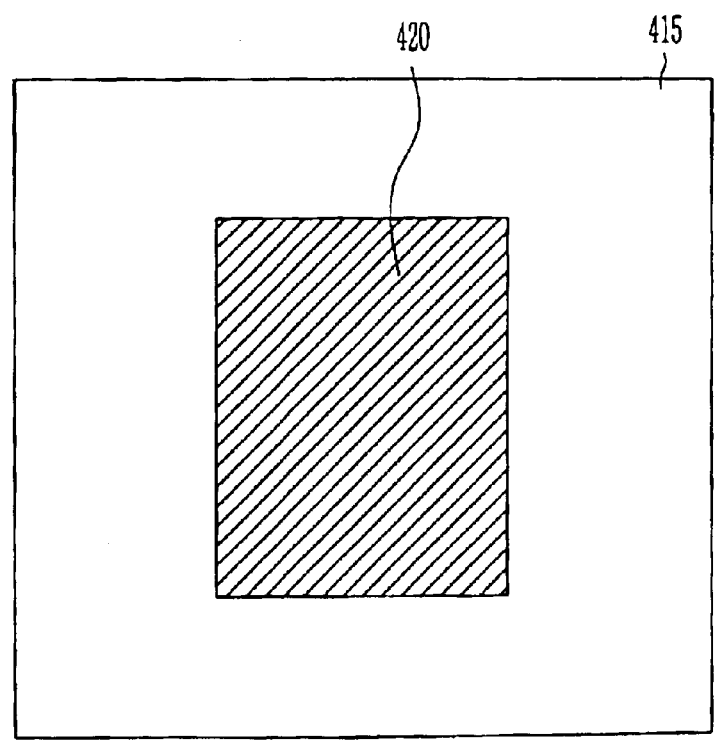

By reference to FIG. 6C and FIG. 7C, a metal layer is formed on the insulating layer 415 including the contact holes 415a. The metal is then patterned by means of patterning process so that the width of the metal is wider than or same to the width of the signal transmission line 410. Thus, the metal layer remains on the lateral surface and bottom of the contact hole 415a and on the insulating layer 415 around the contact holes 415a. The assistant bottom electrode 420 made of the metal layer and electrically/physically connected to the signal transmission line 410 is thus formed. At this time, the assistant bottom electrode 420 may be formed of any one of Au, Al, W, Cu, TiN and Pt by means of chemical vapor deposition method.

Figure 6D:
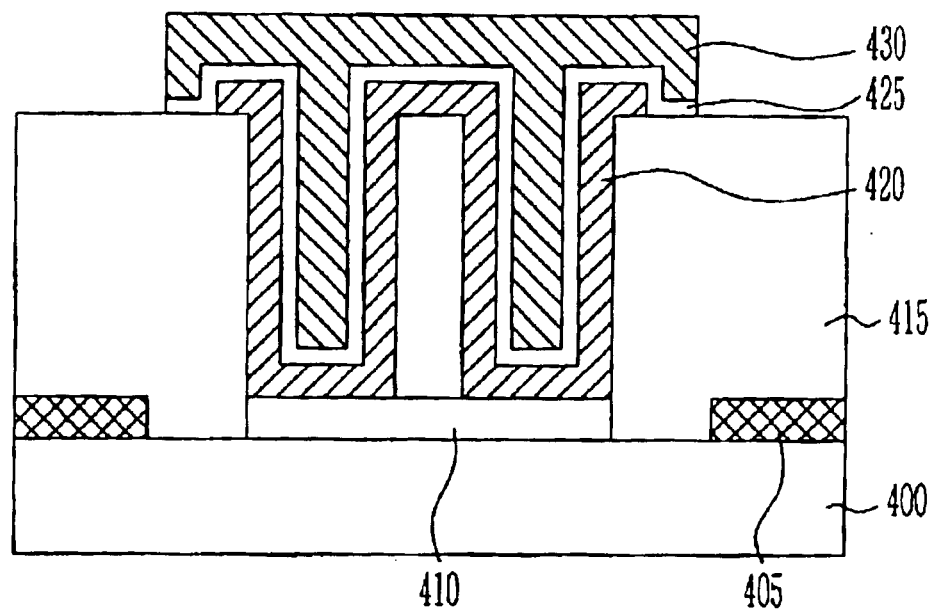
Figure 7D:
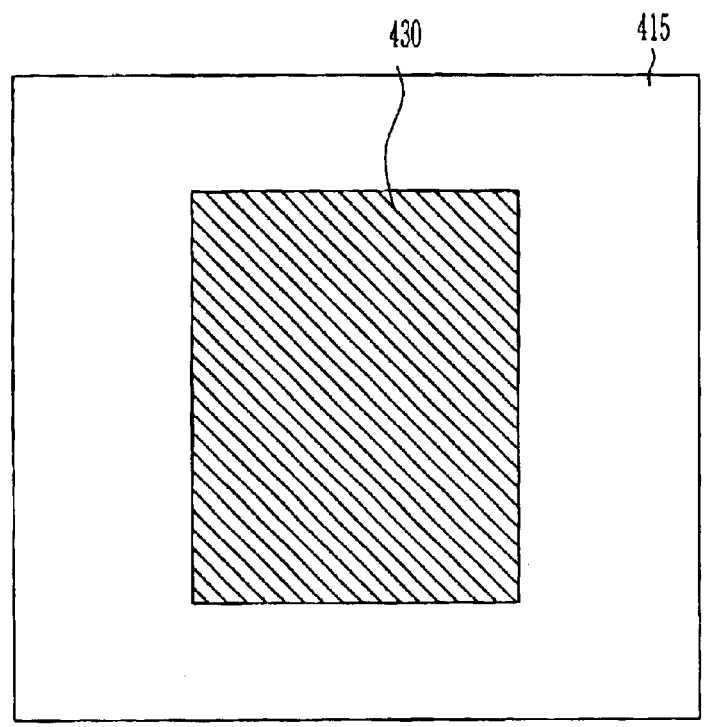

Referring now to FIG. 6D and FIG. 7D, the dielectric film 425 and the assistant top electrode 430 are formed on the region including the assistant bottom electrode 420. At this time, the dielectric film 425 is made of any one of $Si_3N_4$, $Ta_2O_5$, $SrTiO_3$ and $Ba_{0.5}Sr_{0.5}TiO_3$ and the assistant top electrode 430 is formed by depositing any one of Au, Al, W, Cu, TiN and Pt by means of chemical vapor deposition method. Thereafter, the dielectric film 425 and the assistant top electrode 430 remain at a region same to the assistant bottom electrode 420 or remain to be wider than the assistant bottom electrode 420 by means of patterning process using the reactive ion etch method. Through the above process, the capacitor of the three-dimensional structure having the stack structure of the assistant bottom electrode 420, the dielectric film 425 and the assistant top electrode 430 is formed on the insulating layer 415 at the peripheral region of the contact holes 415a including the contact holes 415a.

Figure 6E:
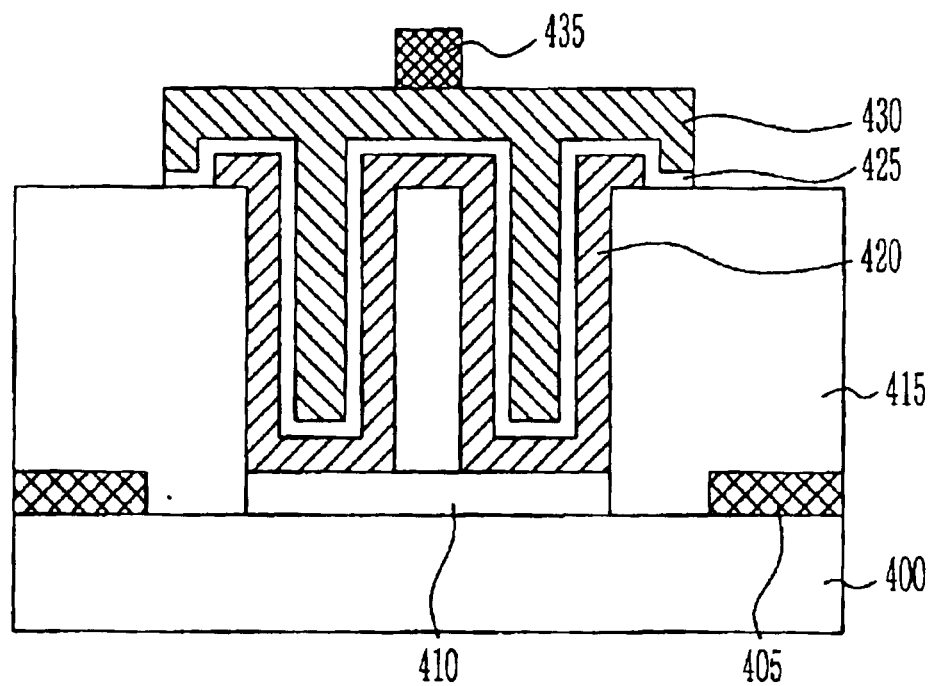
Figure 7E:
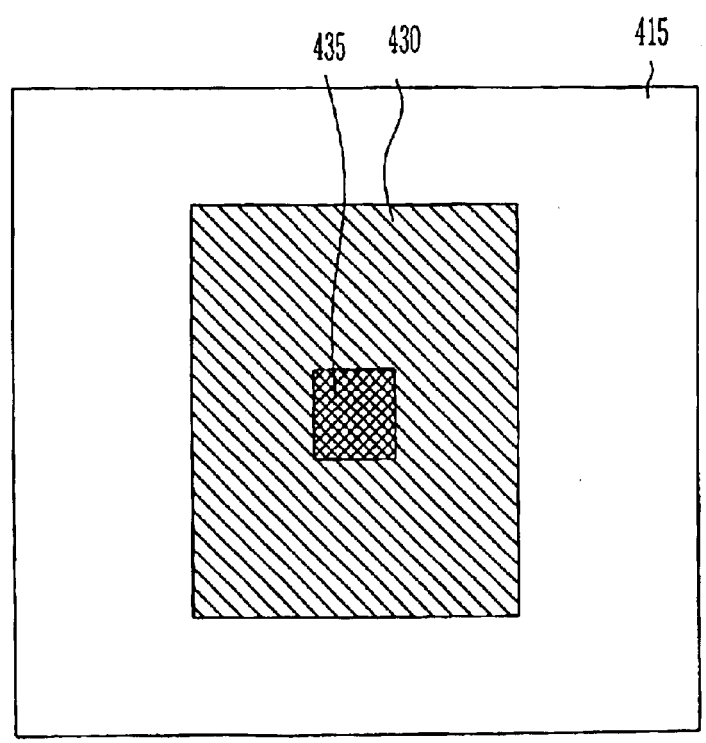

Referring now to FIG. 6E and FIG. 7E, the contact pad 435 is formed on the assistant top electrode 430. At this time, the contact pad 435 is formed by a method by which a noble metal such as Au, Pt, etc. or a conductive oxide layer such $IrO_2$, $RuO_2$, etc. is formed and the noble metal or the conductive oxide layer is then left at the center of the assistant top electrode 430 by means of etch process. Meanwhile, the noble metal or the conductive oxide layer is formed by the evaporation deposition method or the reactive direct current (DC) sputtering method. The etch process includes sequentially performing the lift-off process or the RIE process.

Figure 6F:
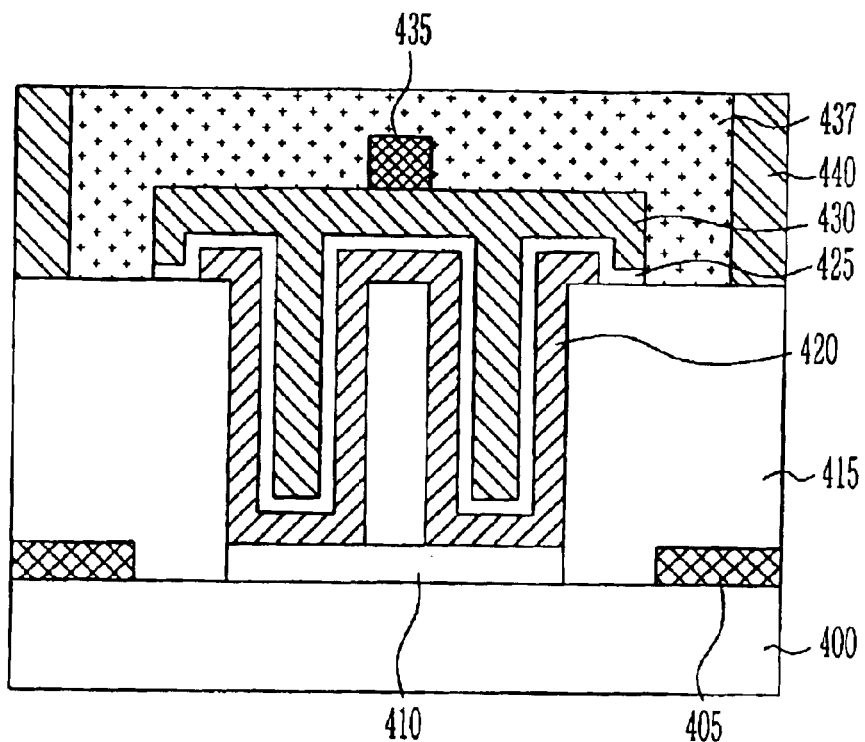
Figure 7F:
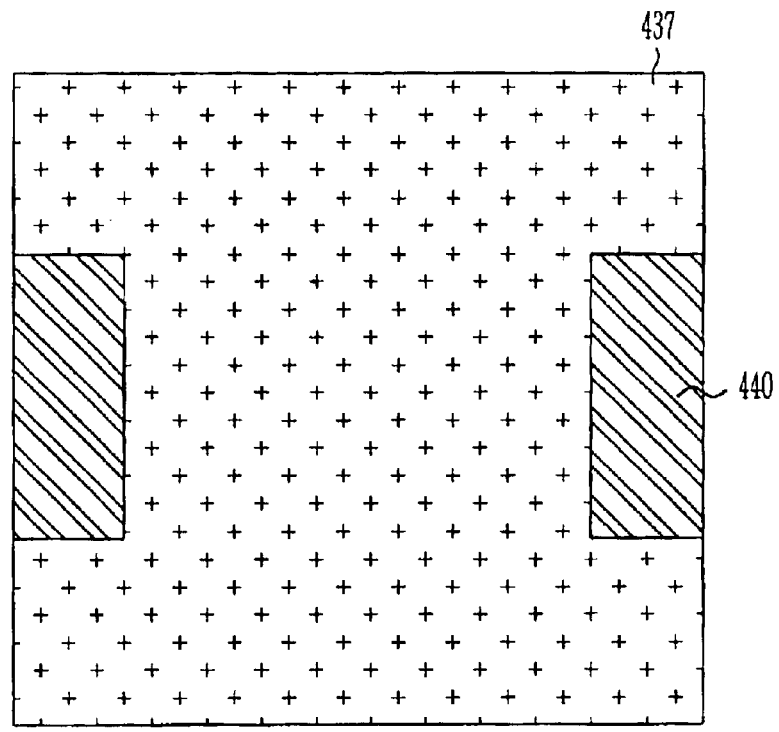

By reference to FIG. 6F and FIG. 7F, after a sacrificial layer 437 is formed on the entire structure, a hole through which the underlying insulating layer 415 is exposed with the assistant top electrodes 430 intervened between them, is formed in the sacrificial layer 437. Next, the hole is buried with a conductive material to form the metal posts 440. At this time, the sacrificial layer 437 may be formed of polyimide and is formed to be higher than the contact pad 435. Also, the metal posts 440 may be formed by forming the conductive material such as Au or Ni using the evaporation deposition method and then leaving the conductive material only in the hole using the lift-off process.

Figure 6G:
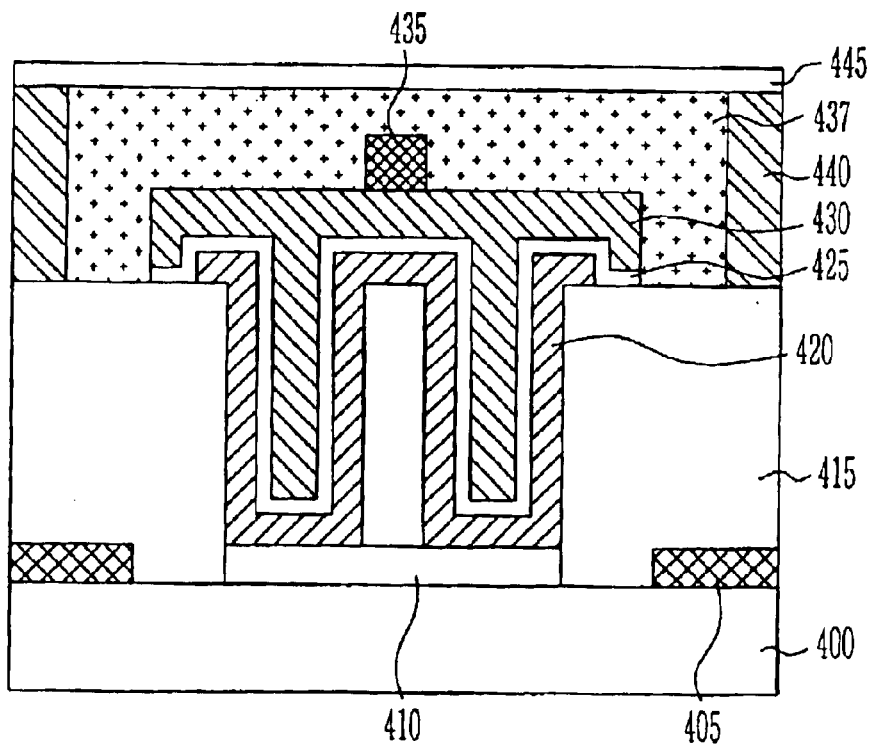
Figure 7G:
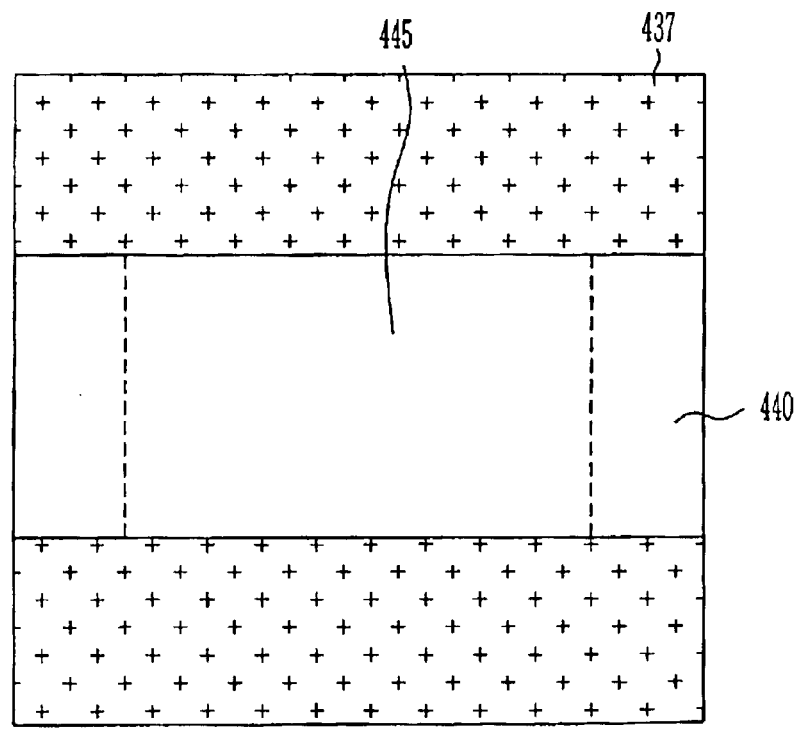

Referring now to FIG. 6G and FIG. 7G, after the conductive material layer is formed on the sacrificial layer 437 by means of the evaporation deposition method, the conductive material layer is patterned by means of the lift-off process to form a deflecting plate 445, so that both edges of the conductive material layer are connected to the metal posts 440 formed with the assistant top electrodes 430 intervened between them. At this time, the conductive material may include any one of Au, Al, W, Cu, TiN, Pt and Ni. Thereby, the deflecting plate 445 is formed vertically to the signal transmission line 410.

Figure 6H:
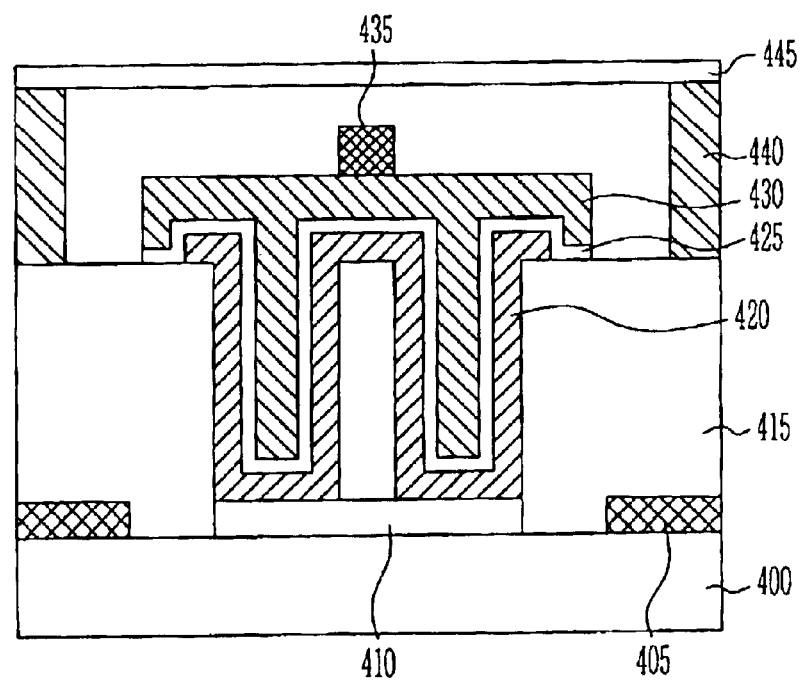
Figure 7H:
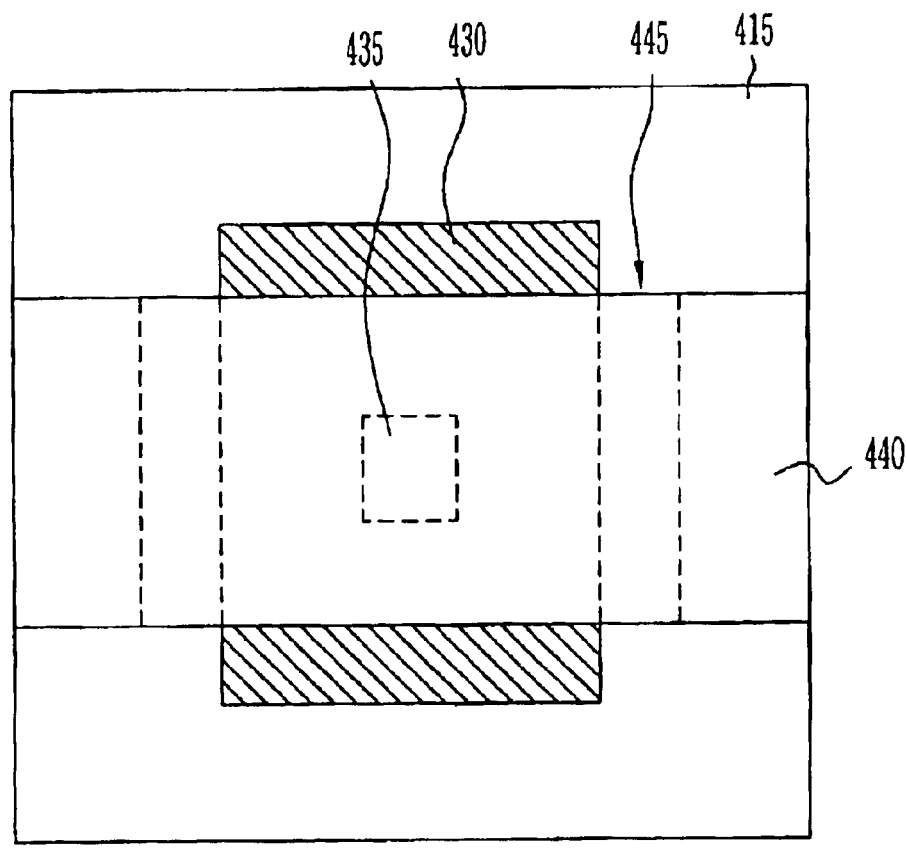

By reference to FIG. 6H and FIG. 7H, the sacrificial layer (437 in FIG. 6G and FIG. 7G) is removed. A given air gap 450 is thus formed between the contact pad 435 and the deflecting plate 445. At this time, the sacrificial layer (437 in FIG. 6G and FIG. 7G) is removed by $O_2$ microwave plasma ashing process.

The capacitive micro-electro-mechanical switch according to the present invention is manufactured through the above processes.

Meanwhile, though it was described that two the metal posts 440 are formed on the insulating layer 415 with the assistant top electrode 430 intervened between them in the drawings, it should be noted that only one metal post 440 is formed and the deflecting plate 445 is fixed to one metal post 440, so that the deflecting plate 445 has a cantilever shape.

Further, it is possible to manufacture the capacitive micro-electro-mechanical switch without forming the ground lines 405. If the capacitive micro-electro-mechanical switch is manufactured to have the co-planar waveguide in which the ground lines 405 are formed, the metal posts 440 are electrically connected to the ground lines 405 (its connection state is not shown). Meanwhile, if the capacitive micro-electro-mechanical switch is manufactured to have the microstrip shape in which the ground lines 405 are not formed, the metal posts 440 are electrically directly connected to the ground terminal (not shown) by means of a metal line formed in a subsequent process.

A capacitive micro-electro-mechanical switch and method of manufacturing the same according to another embodiment of the present invention will be now described.

Figure 8A:
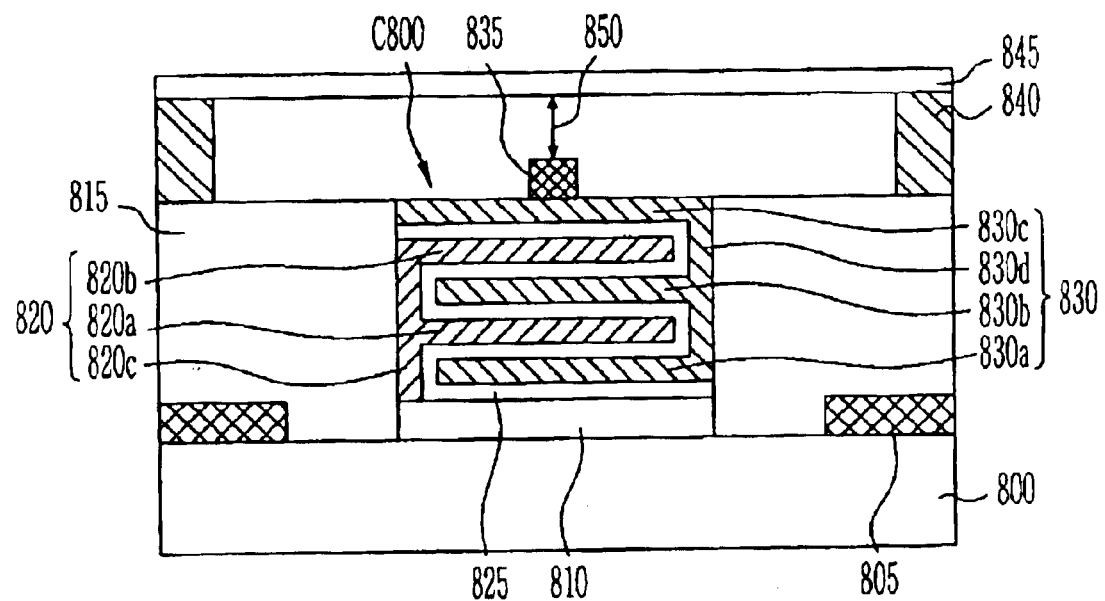
FIG. 8A and FIG. 8B are conceptual drawings for explaining a structure and the operation of a capacitive micro-electro-mechanical switch according to another preferred embodiment of the present invention.
Figure 8B:
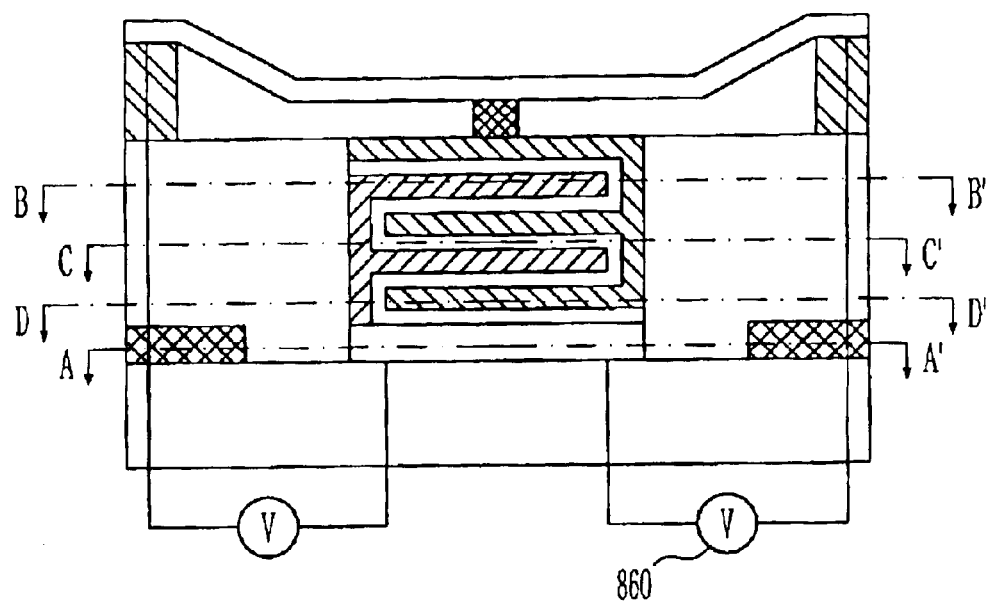

FIG. 8A and FIG. 8B are conceptual drawings for explaining a structure and the operation of a capacitive micro-electro-mechanical switch according to another preferred embodiment of the present invention.

Referring now to FIG. 8A, the capacitive micro-electro-mechanical switch according to another embodiment of the present invention includes ground lines 805, a signal transmission line 810, an insulating layer 815, an assistant bottom electrode 820, a dielectric film 825, an assistant top electrode 830, a metal post 840 and a deflecting plate 845.

In the above, the ground lines 805 are formed on a substrate 800 with the signal transmission line 810 intervened between them. At this time, the substrate 800 may be made of semi-insulating GaAs. Also, the ground lines 805 and the signal transmission line 810 may be formed of a noble metal such as Au, or the like. Meanwhile, an adhesive layer (not shown) may be formed between the substrate 800 and the ground lines 805, and between the substrate 800 and the signal transmission line 810 in order to improve an adhesive characteristic.

The assistant bottom electrode 820 and the assistant top electrode 830 are formed on the signal transmission line 810 in multiple layers. In more detail, assistant bottom electrode layers 820a and 820b and assistant top electrode layers 830a~830c are alternately formed over the signal transmission line 810. The assistant bottom electrode 820 in which the assistant bottom electrode layers 820a and 820b of the multi-layers are electrically connected by the connection element 820c is formed at one edge of the signal transmission line 810. Also, the assistant top electrode 830 in which the assistant top electrode layers 830a~830c of the multi-layers are electrically connected by the connection element 830d is formed at the other edge of the signal transmission line 810. Meanwhile, the dielectric film 825 is formed between the assistant bottom electrode 820 and the assistant top electrode 830, so that the assistant bottom electrode 820 and the assistant top electrode 830 are electrically isolated. Thereby, a multi-layered 3-dimensional capacitor C800 having a structure in which the assistant bottom electrode 820, the dielectric film 825 and the assistant top electrode 830 are stacked is formed on the signal transmission line 810.

The insulating layer 815 is formed on the substrate 800 including the ground lines 805 and the signal transmission line 810 so that the surface of the assistant top electrode 830 is exposed.

The metal posts 840 are formed on the insulating layer 815 with the assistant top electrode 830 intervened between them. The deflecting plate 845 has a thin membrane shape. Also, both edges of the deflecting plate 845 are fixed to the metal posts 840 vertically to the signal transmission line 810. At this time, the deflecting plate 845 does not normally contact the assistant top electrode 830 or the contact pad 835. The height of the metal posts 840 is formed to be higher than the assistant top electrode 830 or the contact pad 835 so that the air gap 850 can be located between the deflecting plate 845 and the contact pad 835. Though it was shown that the two metal posts 840 are formed on the insulating layer 815 with the assistant top electrode 830 intervened between them in the drawing, it should be noted that only one metal post 840 could be formed and the deflecting plate 845 is fixed to one metal post 840 so that the deflecting plate 845 has a cantilever shape.

In the above, it is possible to manufacture the capacitive micro-electro-mechanical switch without forming the ground lines 805. If the capacitive micro-electro-mechanical switch is manufactured to have a co-planar waveguide shape in which the ground lines 805 is formed, the metal posts 840 are electrically connected to the ground lines 805. If the capacitive micro-electro-mechanical switch is manufactured to have a microstrip shape in which the ground lines 805 are not formed, the metal posts 840 are electrically directly connected to the ground terminal (not shown).

Also, additional contact pad 835 may be formed on the assistant top electrode 830. The contact pad 835 may be formed of a noble metal such as Au, Pt, or the like or conductive oxide such as $IrO_2$, $RuO_2$, or the like. At this time, the contact pad 835 may be formed, on the center of the assistant top electrode 830, to have an area smaller than the assistant top electrode 830. If the switch is turned on, the deflecting plate 845 first contacts the contact pad 835 than the assistant top electrode 830.

An electrical signal when the capacitive micro-electro-mechanical switch is in an OFF state is transferred along the signal transmission line 810.

Referring now to FIG. 8B, if a voltage from a voltage supply means 860 is applied between the metal posts 840 and the signal transmission line 810, the electrostatic force is generated by the capacitor having the structure in which the deflecting plate 845, the air gap 850, the contact pad 835 and the assistant top electrode 830 are stacked. If the electrostatic force is generated, the deflecting plate 845 is bent toward the underlying assistant top electrode 830 by means of the electrostatic force, thus contacting the contact pad 835. If the deflecting plate 845 contacts the contact pad 835 or the assistant top electrode 830, the electrical signal transferred along the signal transmission line 810 is isolated by capacitance generated in the capacitor consisting of the assistant bottom electrode 820, the dielectric film 825 and the assistant top electrode 830. Due to this, the electrical signal is bypassed to the ground terminal (not shown) through the assistant top electrode 830.

FIG. 9A~FIG. 9D are plan views of the capacitive micro-electro-mechanical switches shown in FIG. 8B taken along lines A–A', B–B', C–C' and D–D'.

Figure 9A:
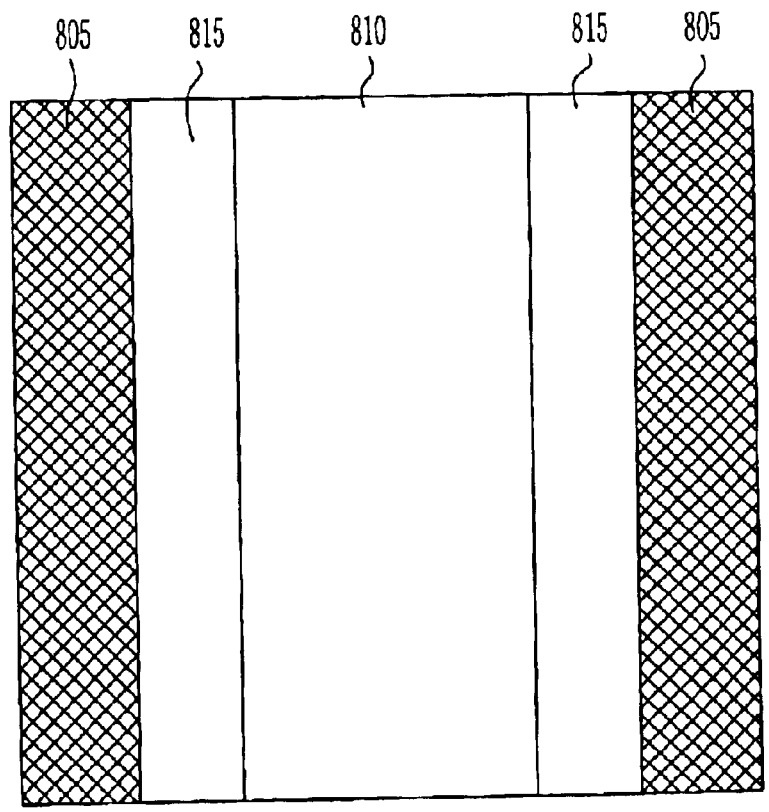
FIG. 9A~FIG. 9B are plan views of the capacitive micro-electro-mechanical switches shown in FIG. 8B taken along lines A–A', B–B', C–C' and D–D'.

Referring now FIG. 9A, the ground lines 805 are formed on the substrate 800 with the signal transmission line 810 intervened between them. The insulating layer 815 is buried between the ground line 805 and the signal transmission line 810.

Figure 9B:
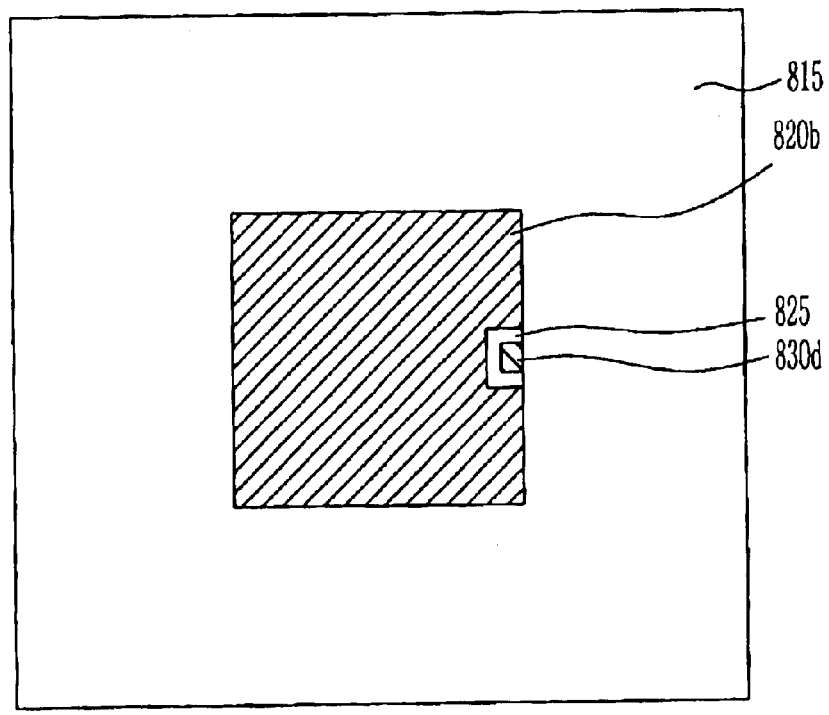

By reference to FIG. 9B, the second assistant bottom electrode layer 820b is widely formed in the layer where the assistant bottom electrode 820 of the multi-layer structure is widely formed. The connection element 830d for connecting the second assistant top electrode layer (830b in FIG. 8b) and the third assistant top electrode layer (830c in FIG. 8c) is formed at some regions of one edge. Meanwhile, the dielectric film 825 is buried between the second assistant bottom electrode layer 820b and the connection element 830d.

Figure 9C:
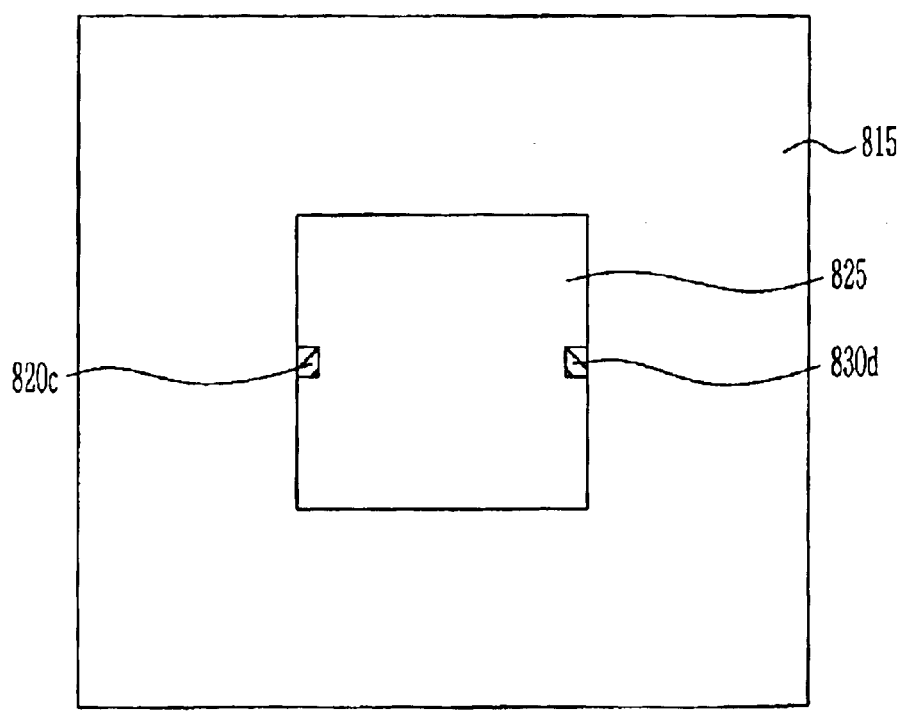

Referring now to FIG. 9C, in the layer where only the connection element 820c of the assistant bottom electrode (820 in FIG. 8B) and the connection element 830d of the assistant top electrode (830 in FIG. 8B) exist, the dielectric film 825 is buried between the connection elements to electrically isolate the first assistant bottom electrode layer (820a in FIG. 8B) and the second assistant top electrode layer (830b in FIG. 8B).

Figure 9D:
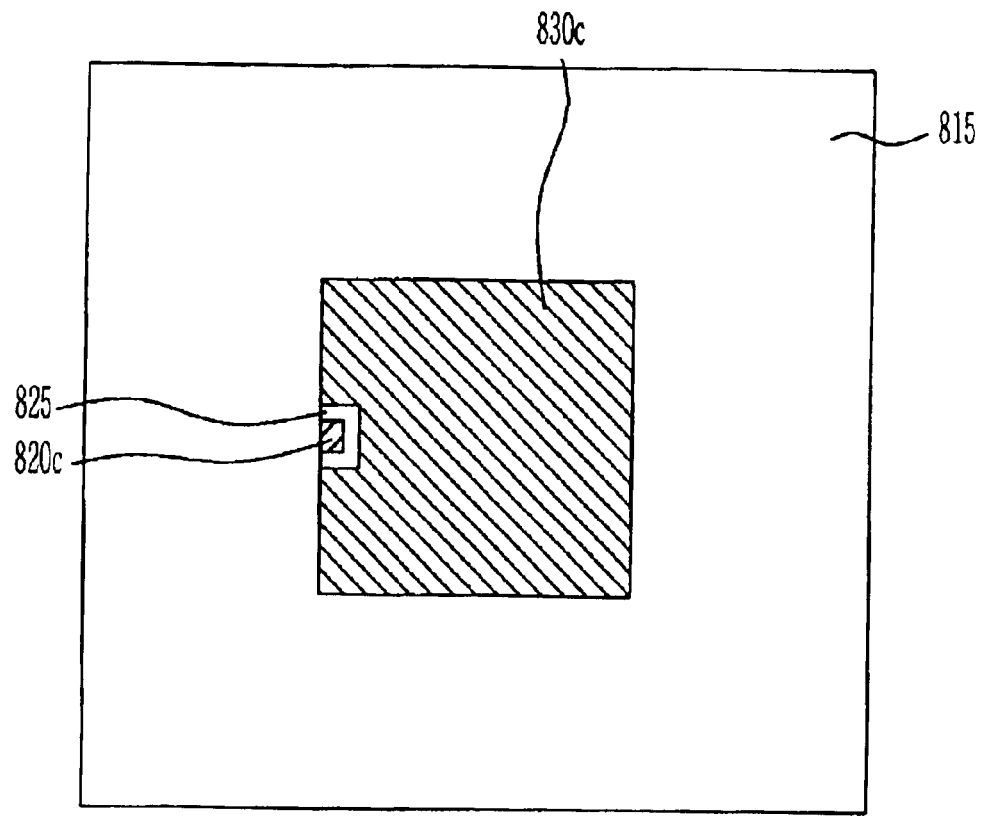

By reference to FIG. 9D, the first assistant top electrode layer 830a is widely formed in the layer where the assistant top electrode (830 in FIG. 8B) of the multi-layer structure is widely formed. The connection element 820c for connecting the first assistant bottom electrode layer (820a in FIG. 8B)

to the signal transmission line (810 in FIG. 8B) is formed at some regions of one edge. Meanwhile, the dielectric film 825 is buried between the first assistant top electrode layer 830a and the connection element 820c.

As above, the present invention can increase the ON/OFF capacitance ratio and improve insertion loss and isolation characteristics by increasing the ON capacitance without an increase in the OFF capacitance or in switch area, using the capacitive micro-electro-mechanical switch of the 3-dimensional structure having the capacitor of the multi-layered 3-dimensional structure in which the assistant bottom electrode 820 of the multi-layer, the dielectric film 825 and the assistant top electrode 830 of the multi-layer are stacked is formed on the signal transmission line 810.

A method of manufacturing the capacitive micro-electro-mechanical switch constructed above will be now described.

FIG. 10A~FIG. 10K are cross sectional views of capacitive micro-electro-mechanical switches for explaining a method of manufacturing the switch.

In the method of manufacturing the capacitive micro-electro-mechanical switch shown in FIG. 10A~FIG. 10K, other processes except for the process of forming the capacitor having the assistant bottom electrode, the dielectric film and the assistant top electrode, and the insulating layer are same to those described by reference to FIG. 6A~FIG. 6H.

Figure 10A:
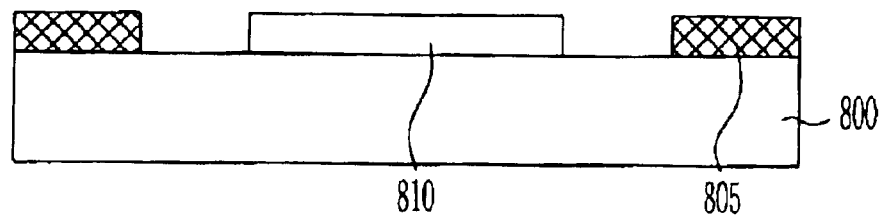
FIG. 10A~FIG. 10K are cross sectional views of capacitive micro-electro-mechanical switches for explaining a method of manufacturing the switch.

Referring now to FIG. 10A, the ground lines 805 and the signal transmission line 810 are formed on the substrate 800. At this time, the ground lines 805 and the signal transmission line 810 are formed so that the signal transmission line 810 is located between the ground lines 805.

Figure 10B:
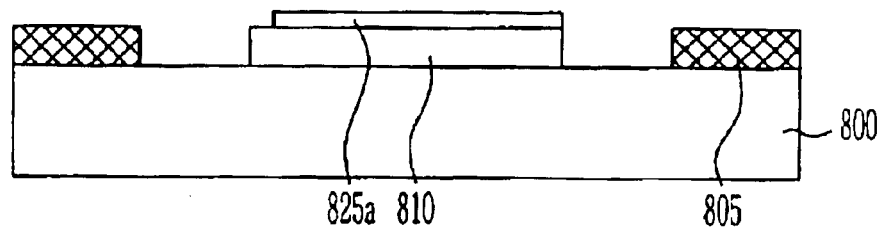

By reference to FIG. 10B, a first dielectric material layer 825a is formed on a given region of the signal transmission line 810 so that the edge of the signal transmission line 810 is exposed. At this time, the first dielectric material layer 825a may be formed of a dielectric material such as $Si_3N_4$, $Ta_2O_5$, STO, BSTO, or the like. The first dielectric material layer 825a may be formed by the radio frequency sputtering method and the dielectric material layer 825a is then left on the given region of the signal transmission line 810 by the reactive ion etch method so that the edge of the signal transmission line 810 is exposed. The dielectric material layer that is formed in a subsequent process is formed by the same method.

Meanwhile, the first dielectric material layer 825a may be formed so that only the central portion of the edge of the signal transmission line 810 is exposed.

Figure 10C:
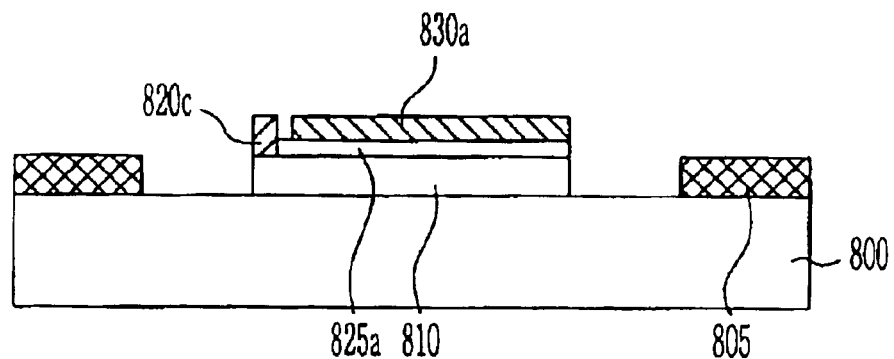

Referring to FIG. 10C, a conductive material such Au, Al, W, Cu, TiN, Pt, or the like is deposited by the evaporation deposition method. Next, the connection element 820c is formed on the signal transmission line 810 on which the first dielectric material layer 825a is not formed by means of the lift-off process, and the first assistant top electrode layer 830a is formed on the first dielectric material layer 825a. At this time, the connection element 820c is formed to be smaller in size than the exposed region of the signal transmission line 810, so that the connection element 820c and the first assistant top electrode layer 830a can be electrically isolated.

Figure 10D:
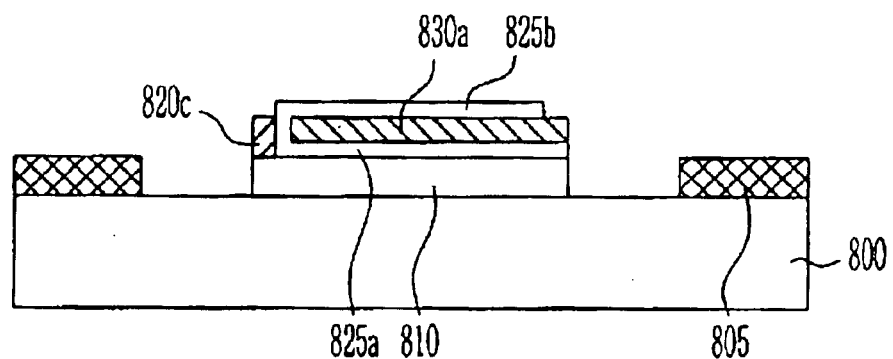

By reference to FIG. 10D, a second dielectric material layer 825b is formed. At this time, the second dielectric material layer 825b is formed so that the top of the connection element 820c and the central portion of the edge of the first assistant top electrode layer 830a is exposed. Also, the second dielectric material layer 825b is buried between the connection element 820c and the first assistant top electrode layer 830a so that the connection element 820c and the first assistant top electrode layer 830a are electrically isolated.

Figure 10E:
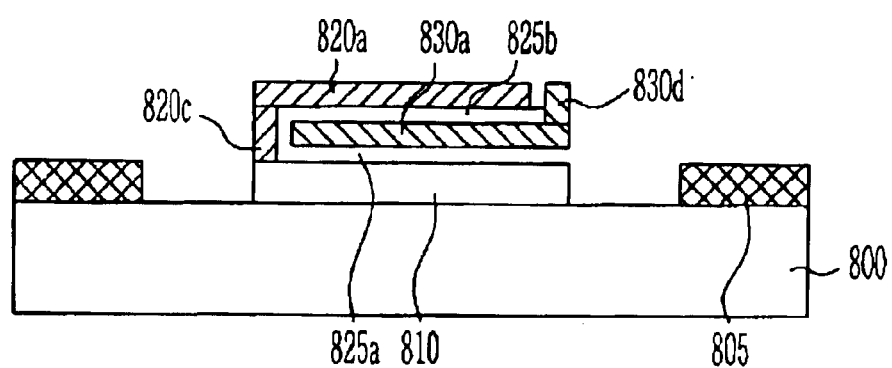
Figure 10F:
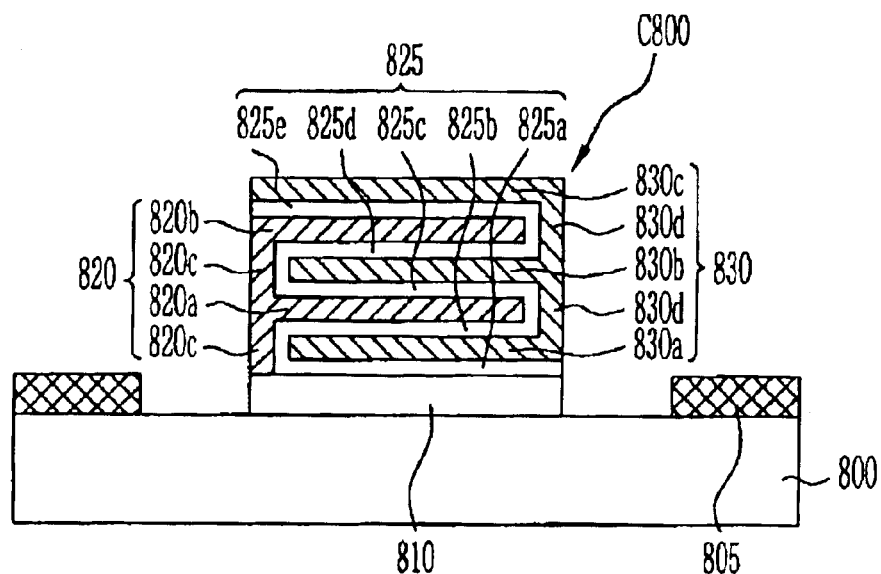

Referring to FIG. 10E, a conductive material such as Au, Al, W, Cu, TiN, Pt, or the like is deposited by means of the evaporation, deposition method. The connection element 830d is formed on the first assistant top electrode layer 830a on which the second dielectric material layer 825b is not formed by means of the lift-off process, and the first assistant bottom electrode layer 820a electrically connected to the connection element 820c is formed on the second dielectric material layer 825b. Similarly, the connection element 830d is formed to be smaller in size than the exposed region of the first assistant top electrode layer 830a so that the connection element 830d and the first assistant bottom electrode layer 820a are electrically isolated Referring to FIG. 10F, the process steps that were described by reference to FIG. 10C~FIG. 10E are repeatedly performed to form the assistant bottom electrode 820, the dielectric film 825 and the assistant top electrode 830 on the signal transmission line 810. At this time, the assistant bottom electrode 820 includes the first and second assistant bottom electrode layers 820a and 820b and the connection element 820c. The assistant bottom electrode is electrically connected to the signal transmission line 810 by means of the connection element 820c. Also, the assistant top electrode 830 includes the first~third assistant top electrode layers 830a~830c and the connection element 830d. At this time, the surface of the third assistant top electrode layer 830c is exposed toward an upper side the capacitor. The dielectric film 825 includes first fifth dielectric material layers 825a~825e and is formed between the assistant bottom electrode 820 and the assistant top electrode 830.

Thereby, a capacitor C800 having a multi-layered 3-dimensional structure in which the assistant bottom electrode 820 of the multi-layer structure, the dielectric film 825 and the assistant top electrode 830 of the multi-layer structure are stacked, is formed on the signal transmission line 810.

Figure 10G:
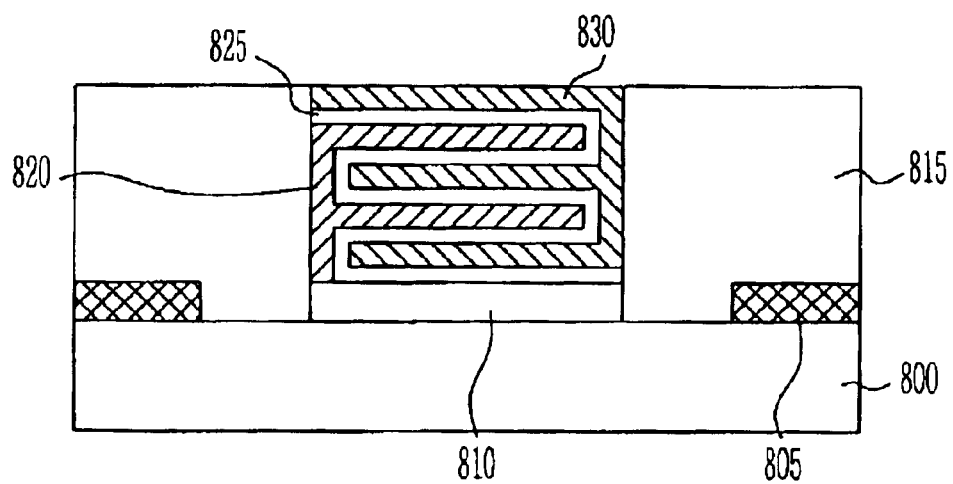

Referring to FIG. 10G, the insulating layer 815 is formed on the entire structure up to the height of the capacitor C800. At this time, the insulating layer 815 is formed using any one of silicate glass, PSG (phosphorus doped-silicate glass) and BPSG (boron phosphorus doped-silicate glass) by means of the chemical vapor deposition method or spin coating. Next, the upper side of the insulating layer 815 is flattened and the surface of the assistant top electrode 830 is simultaneously exposed, by means of chemical mechanical polishing (CMP) process or blanket etch-back process.

Figure 10H:
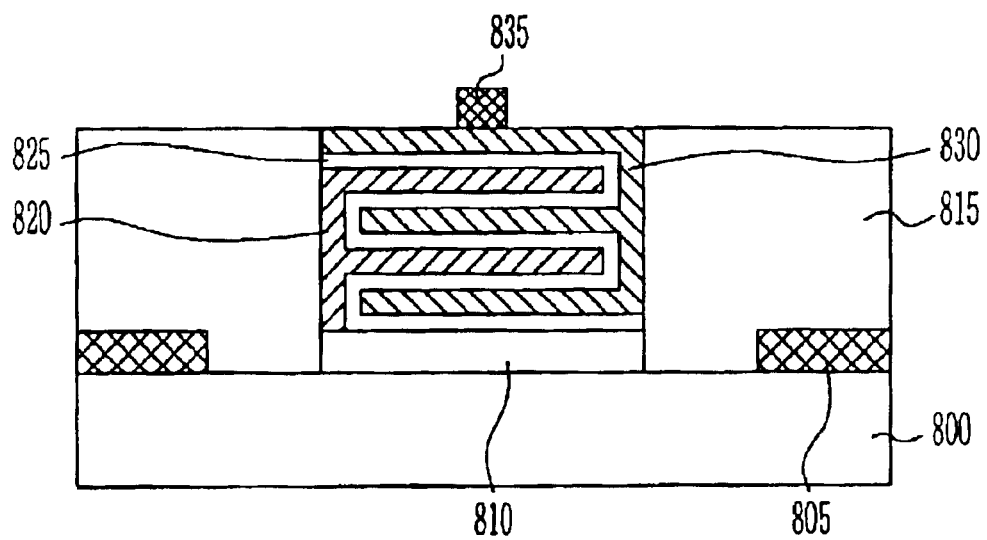

By reference to FIG. 10H, the contact pad 835 is formed on the assistant top electrode 830. At this time, the contact pad 835 is formed by a method by which a noble metal such as Au, Pt, etc. or a conductive oxide layer such as $IrO_2$, $RuO_2$, etc. is formed, and the noble metal or the conductive oxide layer is left at the center of the assistant top electrode 830 by means of etch process. Meanwhile, the noble metal or the conductive oxide layer is formed by the evaporation deposition method or the reactive DC sputtering method. Also, the etch process includes performing the lift-off process or the reactive ion etch process.

Figure 10I:
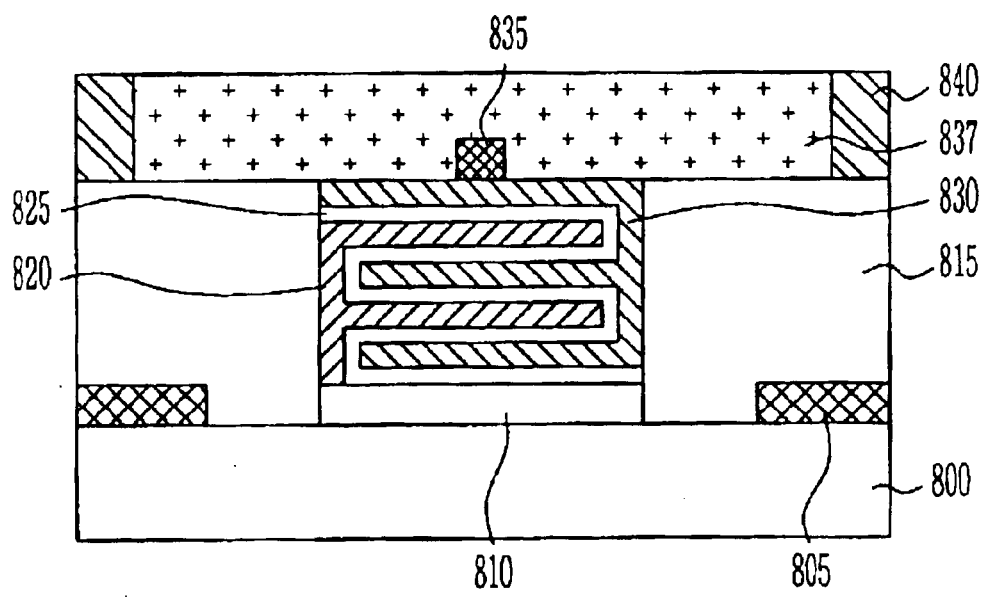

Referring now to FIG. 10I, the sacrificial layer 837 is formed on the entire structure. A hole through which the underlying insulating layer 815 is exposed is formed in the sacrificial layer 837 with the assistant top electrode 830 intervened. Next, the hold is buried with a conductive material to form the metal post 840. At this time, the sacrificial layer 837 may be formed of polyimide and is formed to be higher than the contact pad 835. Further, the metal post 840 may be formed by depositing any one of Au, Al, W, Cu, TiN, Pt and Ni using the evaporation deposition method and then leaving the conductive material only at the hole using the lift-off process.

Figure 10J:
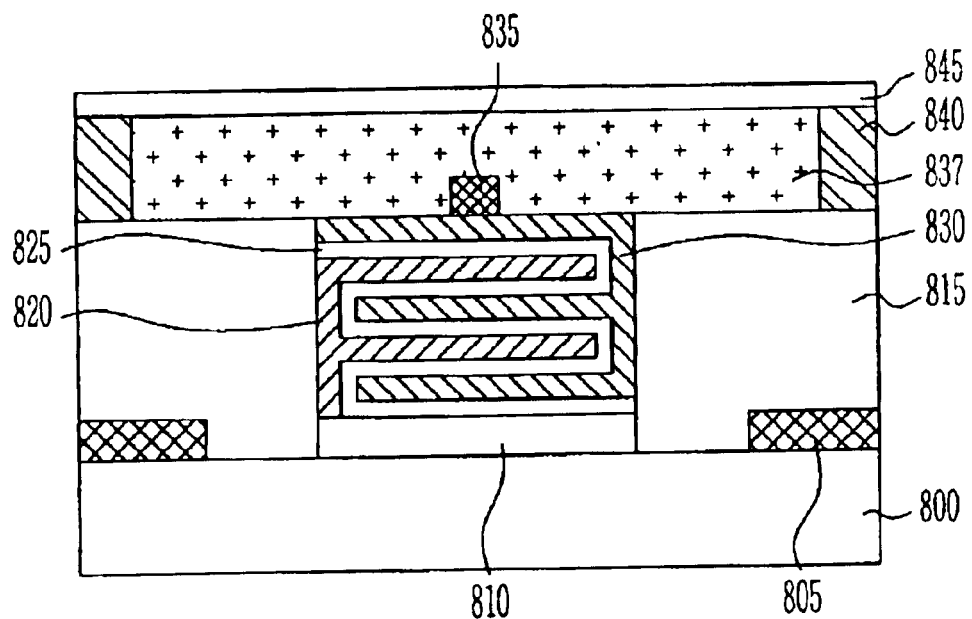

By reference to FIG. 10J, a conductive material layer is formed on the sacrificial layer 837 by means of the evaporation deposition method. The conductive material layer is then patterned by a patterning process such as the lift-off process so that both edges of the conductive material layer are connected to the metal post 840 formed with the assistant top electrode 830 intervened, thus forming the deflecting plate 845. At this time, the conductive material may include any one of Au, Al, W, Cu, TiN, Pt and Ni. Thereby, the deflecting plate 845 is formed vertically to the signal transmission line 810.

Figure 10K:
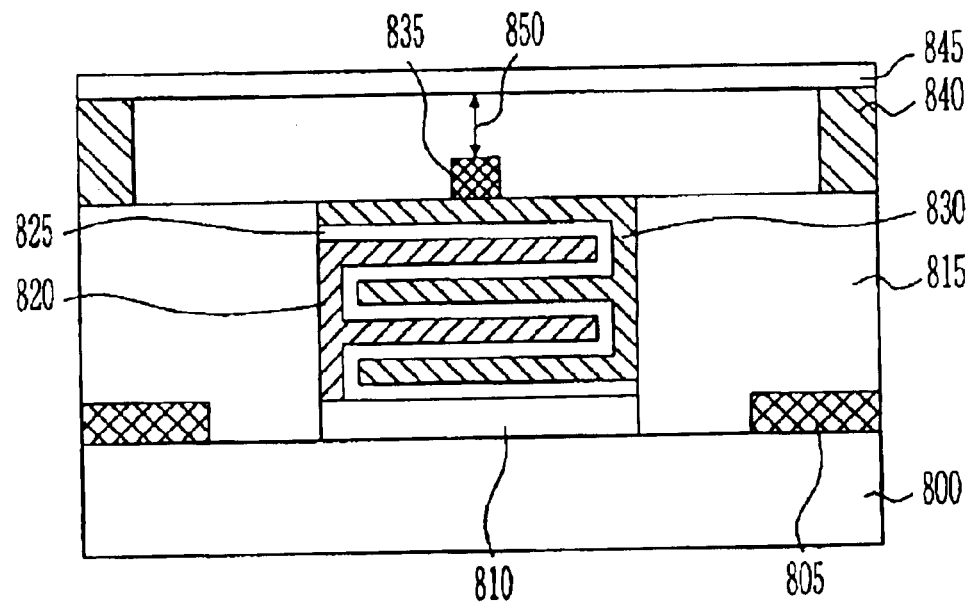

Referring to FIG. 10K, the sacrificial layer (837 in FIG. 10J) is removed. Thus, a given air gap 850 is formed between the contact pad 835 and the deflecting plate 845. At this time, the sacrificial layer (837 in FIG. 10J) is removed by $O_2$ microwave plasma ashing process.

Through the above processes, the capacitive micro-electro-mechanical switch according to the present invention is manufactured.

The methods of manufacturing the capacitive micro-electro-mechanical switches that were described by reference to FIG. 6A~FIG. 6H and FIG. 10A~FIG. 10K have the following advantages and disadvantages.

First, the method described by reference to FIG. 6A~FIG. 6H requires high level process technologies such as the deep RIE process in which the hole of the high aspect ratio is formed in the insulating layer and the CVD process in which the assistant bottom electrode and the assistant top electrode made of Au, Al, W, Cu, TiN, Pt, etc. and the dielectric film made of $Si_3N_4$, $Ta_2O_5$, STO, BSTO, etc. are formed in the hole. In particular, the CVD process for the Pt electrode and BSTO having a high dielectric constant that are used to secure high capacitance per unit area of the capacitor, is technically very difficult.

On the contrary, the method described by reference to FIG. 10A~FIG. 10K uses relatively easy process technologies. However, this method requires a long manufacture time and has a low productivity, since deposition of the assistant bottom electrode, the dielectric film and the assistant top electrode, photo-lithography and the etch process must be repeatedly performed.

Figure 3A:
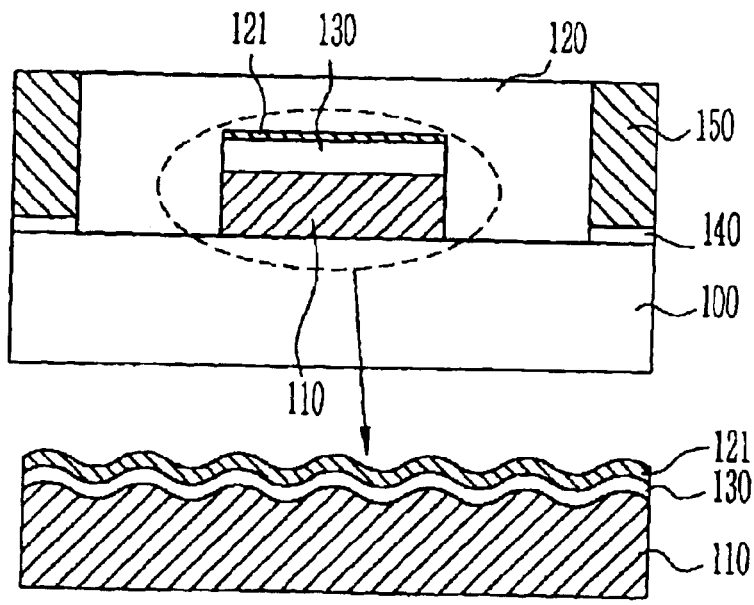
FIG. 3A and FIG. 3B are conceptual drawings for explaining a structure and the operation of another conventional capacitive micro-electro-mechanical switch.
Figure 3B:
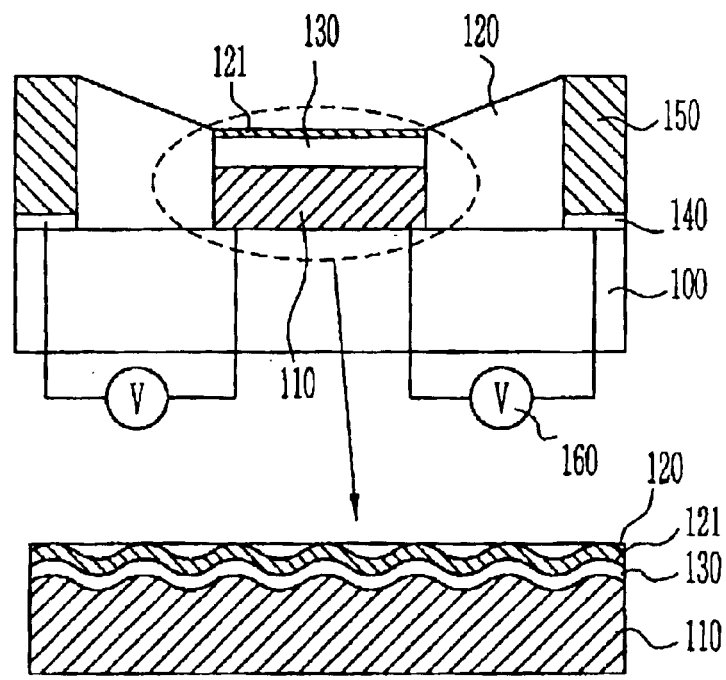

Further, the ratio ($C_{on}/C_{off}$) of the ON/OFF capacitance in the capacitive micro-electro-mechanical switch having the capacitor of the 3-dimensional structure shown in FIG. 4A or FIG. 8A, and the switch having the capacitor of the flat type 2-dimensional structure shown in FIG. 3A is as follows.

First, assuming that other parameters except for the area (A) of the capacitor upon ON/OFF in Equations 1 and 2, that is, the thickness ($h_{dielectric}$) of the dielectric film, the thickness ($h_{air}$) of the air gap, and the dielectric constant ($\epsilon_{dielectric}$) of the dielectric film are same in the switch of any type, the ratio of the ON/OFF capacitance matches to the area ratio of the ON/OFF capacitor.

In the conventional switch shown in FIG. 3A, the area ratio of the ON/OFF capacitor is always "1", as described before. In the switch of the present invention, however, as the area of the capacitor in the ON state is larger than the area of the capacitor in the OFF state, the area ratio of the ON/OFF capacitor is higher than 1.

For example, the ON/OFF area ratio of the capacitor of the 3-dimensional structure having the hole structure and the multi-layer shape in a state that the contact pad is not formed is as follows.

First, the area of the capacitor in the state is same to the area of the assistant top electrode region exposed to air regardless of the shape of the capacitor, that is, hole or multi-layer shape. Assuming that this region is a square of 100 $\mu$m in width, the area is 10,000 $\mu m^2$.

The capacitor area in the ON state is decided by the shape of the capacitor. As shown in FIG. 4A and FIG. 8A, assuming that the area of the overlapped region of the deflecting plate and the signal transmission line in which the capacitor is formed is same to the area (10,000 $\mu m^2$) of the assistant top electrode region (i.e., the capacitor area in the OFF state) exposed to air, the capacitor area in the ON state is as follows.

First, in cases that the capacitor of a concaved structure is formed in the hole, assuming that the width of the hole is 2 $\mu$m, the depth is 100 $\mu$m, the distance between the holes is 2 $\mu$m, the thickness of the assistant bottom electrode is 0.2 $\mu$m and the thickness of the dielectric film is 0.1 $\mu$m, then the area of the unit capacitor is 560 $\mu m^2$, the number of the capacitor is 625 and the total area of the capacitor is 350,000 $\mu m^2$. Therefore, the ON/OFF capacitor area ratio becomes 350,000/10,000=35.

On the other hand, in case that the multi-layered capacitor is formed, the area of the unit capacitor is same to the area of the assistant top electrode region exposed to air, 10,000 $\mu m^2$, the number of the capacitor is the number (N) of the stacked layers in the dielectric material layer and the total area of the capacitor is N*10,000 $\mu m^2$. Therefore, the ON/OFF capacitor area ratio becomes N*10,000/10,000=N, which is increased in proportion to the stacked number of the dielectric film.

As such, the switch having the capacitor of the 3-dimensional structure proposed by the present invention has a significant higher ratio of the ON/OFF capacitance than the conventional switch having the flat type capacitor of the 2-dimensional structure. Therefore, the capacitive micro-electro-mechanical switch having low insertion loss and high isolation characteristics can be manufactured.

As mentioned above, according to the present invention, a capacitor of a 3-dimensional structure is formed on a signal transmission line. Therefore, the present invention has an outstanding effect that it can improve insertion loss and isolation characteristics by increasing an ON/OFF capacitance ratio without increasing an capacitor area.

The present invention has been described with reference to a particular embodiment in connection with a particular application. Those having ordinary skill in the art and access to the teachings of the present invention will recognize additional modifications and applications within the scope thereof. The size or thickness of the films or regions is exaggerated for clarity purpose.

It is therefore intended by the appended claims to cover any and all such applications, modifications, and embodiments within the scope of the present invention.

What is claimed is:

1. A capacitive micro-electro-mechanical switch, comprising:
   a first line form on a substrate;
   an insulating layer having a hole through which a given region of the first line is exposed;
   a capacitor of a 3-dimensional structure formed in the hole on the first line;
   a metal post formed, on the insulating layer, in a direction vertical to the first lines from the capacitor; and
   a second line spaced apart from the top of the capacitor by a given gap, wherein a portion of the second line is overlapped with the capacitor and an edge of the second line is fixed to the metal post in a direction vertical to the first line.

2. The capacitive micro-electro-mechanical switch as claimed in claim 1, wherein a plurality of holes are formed in the insulating layer, and wherein the capacitor has a stack structure of an assistant bottom electrode, a dielectric film and an assistant top electrode and each of the plurality of holes has shape with a 3-dimensional structure.

3. The capacitive micro-electro-mechanical switch as claimed in claim 2, wherein the capacitor includes unit capacitors formed in every hole and the unit capacitors are in parallel connected one another.

4. The capacitive micro-electro-mechanical switch as claimed in claim 2, wherein the assistant bottom electrode and the assistant top electrode are made of any one of Au, Al, W, Cu, TiN and Pt.

5. The capacitive micro-electro-mechanical switch as claimed in claim 2, wherein the dielectric film is made of any one of $Si_3N_4$, $Ta_2O_5$, $SrTiO_3$ and $Ba_{0.5}Sr_{0.5}TiO_3$.

6. The capacitive micro-electro-mechanical switch as claimed in claim 1, wherein the capacitor has a 3-dimensional structure of a multi-layered shape including:

an assistant bottom electrode having multi-layered electrode layers connected one another at one edge of the first line and electrically connected to the first line;

an assistant top electrode having multi-layered electrode layers connected one another at the other edge of the first line, wherein the uppermost layer of the assistant top electrode is exposed; and a dielectric film formed between the assistant bottom electrode and the assistant top electrode.

7. The capacitive micro-electro-mechanical switch as claimed in claim 1, further comprising an adhesive layer between the substrate and the first line.

8. The capacitive micro-electro-mechanical switch as claimed in claim 1, wherein the insulating layer is made of any one of silicate glass, PSG and BPSG.

9. The capacitive micro-electro-mechanical switch as claimed in claim 1, further comprising a conductive contact pad on the capacitor.

10. The capacitive micro-electro-mechanical switch as claimed in claim 9, wherein the contact pad is made of a noble metal or a conductive oxide layer.

11. The capacitive micro-electro-mechanical switch as claimed in claim 1, further comprising ground lines on the substrate with the first line intervened, and wherein the metal post is electrically connected to the ground lines.

12. The capacitive micro-electro-mechanical switch as claimed in claim 1, wherein the metal post is formed only 1 in number and is connected to the second line in a cantilever shape.

13. The capacitive micro-electro-mechanical switch as claimed in claim 1, wherein the metal post is formed at both sides of the capacitor and both ends of the second line are fixed to the metal post.

14. The capacitive micro-electro-mechanical switch as claimed in claim 1, wherein the metal post is made of any one of Au, Al, W, Cu, TiN, Pt and Ni.

15. The capacitive micro-electro-mechanical switch as claimed in claim 1, wherein the second line is made of any one of Au, Al, W, Cu, TiN, Pt and Ni.

* * * * *